United States Patent
Choi et al.

(10) Patent No.: US 11,496,986 B1
(45) Date of Patent: Nov. 8, 2022

(54) DISTRIBUTED POSITIONING PROCEDURE FOR VEHICULAR-UES IN OUT-OF-COVERAGE CELLULAR NETWORKS

(71) Applicant: QUALCOMM Incorporated, San Diego, CA (US)

(72) Inventors: Chang-Sik Choi, Seoul (KR); Kapil Gulati, Belle Mead, NJ (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/320,039

(22) Filed: May 13, 2021

(51) Int. Cl.
*H04W 64/00* (2009.01)
(52) U.S. Cl.
CPC .................................. *H04W 64/00* (2013.01)
(58) Field of Classification Search
None
See application file for complete search history.

(56) References Cited

U.S. PATENT DOCUMENTS

2019/0335416 A1\* 10/2019 Kumar ................ H04W 72/048
2021/0099832 A1   4/2021 Duan et al.

FOREIGN PATENT DOCUMENTS

| EP | 3742829 A1 | 11/2020 |
| WO | WO 2021225696 | 11/2021 |

OTHER PUBLICATIONS

International Search Report and Written Opinion—PCT/US2022/071420—ISA/EPO—dated Jul. 15, 2022.
Qualcomm Incorporated: "On Unlicensed Positioning and Applicable Use Cases", 3GPP Draft, 3GPP RAN #86, RP-192527, 3RD Generation Partnership Project (3GPP), Mobile Competence Centre, 650, Route Des Lucioles, F-06921 Sophia-Antipolis Cedex France, No. Sitges, Spain, Dec. 9, 2019-Dec. 12, 2019 Dec. 2, 2019 (Dec. 2, 2019), XP051834167, 12 Pages, Retrieved from the Internet: URL:https://ftp.3gpp.org/tsg_ran/TSG_RAN/TSGR_86/Docs/RP-192527.zip RP-192527 On Unlicensed Positioning and Applicable Use Cases.pdf [retrieved on Dec. 2, 2019] the whole document, p. 11.

\* cited by examiner

*Primary Examiner* — Suhail Khan
(74) *Attorney, Agent, or Firm* — Campbell C. Chiang; Weaver Austin Villeneuve & Sampson LLP

(57) ABSTRACT

An initiator UE may be configured to send one or more units of messages to one or more responder UEs. A unit of message may include a pre-PRS message, a PRS message and a post-PRS message. A responder UE may be configured to send one or more units of messages to the initiator UE. The pre-PRS message and the post-PRS message may be sent or received using a license spectrum. The PRS message may be sent or received using an unlicensed spectrum. The communication between the initiator UE and the responder UE may be initiated by the initiator UE identifying the responder UE from a plurality of UEs based on positioning properties of the responder UE. The positioning properties of the responder UE may include a direction, a velocity, a location confidence or a location of the responder UE, or a combination thereof.

40 Claims, 12 Drawing Sheets

DISTRIBUTED POSITIONING PROCEDURE FOR VEHICULAR-UES IN OUT-OF-COVERAGE CELLULAR NETWORKS

BACKGROUND

1. Field of Disclosure

The present disclosure relates generally to the field of wireless communication, and more specifically to determining the location of User Equipment (UE) using positioning reference signal (PRS).

2. Description of Related Art

Wireless communication systems or wireless networks are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipments (UEs). A user equipment (UE) may communicate with a base station (BS) via a downlink and uplink. The downlink (or forward link) refers to the communication link from the BS to the UE, and the uplink (or reverse link) refers to the communication link from the UE to the BS. A BS may be referred to as a Node B, a gNodeB (gNB), an access point (AP), a radio head, a transmit receive point (TRP), a New Radio (NR) BS, a 5G Node B, and/or the like.

BRIEF SUMMARY

Examples of techniques for positioning of a user equipment (UE) using positioning reference signal (PRS) may be disclosed. An initiator UE may be configured to transmit one or more units of messages to each of multiple responder UEs. A unit of message may include a pre-PRS message, a PRS message and a post-PRS message. Each of the responder UEs may be configured to transmit one or more units of messages to the initiator UE. The pre-PRS message and the post-PRS message may be transmitted using a license spectrum. The PRS message may be transmitted using an unlicensed spectrum. The communication between the initiator UE and each of the responder UEs may be performed using a pairwise approach, with a communication between the initiator UE and a first responder UE performed independently of a communication between the initiator UE and a second responder UE.

In some aspects, an initiator UE is provided for positioning using PRS. An example method may include the initiator UE transmitting a pre-positioning reference signal (pre-PRS) message associated with the initiator UE to a responder UE. The pre-PRS message may include one or more characteristics of a transmission associated with the initiator UE. The initiator UE may receive from the first responder UE a pre-PRS message associated with the first responder UE configured to include one or more characteristics of a transmission associated with the first responder UE. Based on receiving the pre-PRS message associated with the first responder UE, the initiator UE may transmit to the first responder UE a PRS message associated with the initiator UE using the one or more characteristics of the transmission associated with the initiator UE. Based on transmitting of the PRS message associated with the initiator UE, the initiator UE may receive from the first responder UE a PRS message according to the one or more characteristics of the transmission associated with the first responder UE. Based on receiving the PRS message associated with the first responder UE, the initiator UE may transmit to the first responder UE a post-PRS message associated with the initiator UE. The post-PRS message associated with the initiator UE may include at least an indication that the initiator UE receives the PRS message from the first responder UE. Based on the transmitting of the post-PRS message associated with the initiator UE, the initiator UE may receive from the first responder UE a post-PRS message associated with the first responder UE. The post-PRS message associated with the first responder UE may be configured to include timing data related to a departure time of the PRS message associated with the first responder UE and timing data related to an arrival time of the PRS message associated with the initiator UE. The initiator UE may receive data related to a location of the first responder UE from the first responder UE.

In some aspects, an initiator UE configured with one or more transceivers, a memory, and one or more processors may be used to establish a communication with a first responder UE using PRS. For example, the initiator UE may be configured to transmit, to the first responder UE, a pre-PRS message associated with the initiator UE. The pre-PRS message associated with the initiator UE may be configured to include one or more characteristics of a transmission associated with the initiator UE. The initiator UE may receive, from the first responder UE, a pre-PRS message associated with the first responder UE configured to include one or more characteristics of a transmission associated with the first responder UE. The initiator UE may transmit, to the first responder UE and based on receiving the pre-PRS message associated with the first responder UE, a PRS message associated with the initiator UE using the one or more characteristics of the transmission associated with the initiator UE. The initiator UE may receive from the first responder UE, based on the transmitting of the PRS message associated with the initiator UE, a PRS message according to the one or more characteristics of the transmission associated with the first responder UE. The initiator UE may transmit to the first responder UE, based on receiving the PRS message associated with the first responder UE, a post-PRS message associated with the initiator UE and may include at least an indication that the initiator UE receives the PRS message from the first responder UE. The initiator UE may receive from the first responder UE, based on the transmitting of the post-PRS message associated with the initiator UE, a post-PRS message associated with the first responder UE and configured to include timing data related to a departure time of the PRS message associated with the first responder UE and timing data related to an arrival time of the PRS message associated with the initiator UE. The initiator UE may receive data related to a location of the first responder UE at the departure time of the post-PRS message from the first responder UE.

In some aspects, a responder UE may be used for positioning of an initiator UE using PRS. An example method may include the responder UE receiving, from the initiator UE, a pre-PRS message associated with the initiator UE configured to include one or more characteristics of a transmission associated with the initiator UE. The responder UE may transmit to the initiator UE a pre-PRS message associated with the responder UE configured to include one or more characteristics of a transmission associated with the responder UE. The responder UE may receive from the initiator UE, based on transmitting the pre-PRS message associated with the responder UE, a PRS message associated with the initiator UE according to the one or more characteristics of the transmission associated with the initiator UE. The responder UE may transmit to the initiator UE, based on the receiving of the PRS message associated with the initiator UE, a PRS message using the one or more characteristics of the transmission associated with the responder UE. The responder US may receive from the initiator UE, based on the transmitting the PRS message associated with the responder UE, a post-PRS message associated with the initiator UE. The post-PRS message may include at least an indication that the initiator UE receives the PRS message from the first responder. The responder UE may transmit to the initiator UE, based on the receiving of the post-PRS message associated with the initiator UE, a post-PRS message associated with the responder UE configured to include timing data related to a departure time of the PRS message associated with the responder UE and timing data related to an arrival time of the PRS message associated with the initiator UE.

In some aspects, a responder UE configured with one or more transceivers, a memory, and one or more processors may be used to establish a communication with an initiator UE using PRS. For example, the responder UE may be configured to receive from an initiator UE a pre-PRS message associated with the initiator UE configured to include one or more characteristics of a transmission associated with the initiator UE. The responder UE may transmit to the initiator UE a pre-PRS message associated with the responder UE configured to include one or more characteristics of a transmission associated with the responder UE. The responder UE may receive from the initiator UE, based on transmitting the pre-PRS message associated with the responder UE, a PRS message associated with the initiator UE according to the one or more characteristics of the transmission associated with the initiator UE. The responder UE may transmit to the initiator UE, based on the receiving of the PRS message associated with the initiator UE, a PRS message using the one or more characteristics of the transmission associated with the responder UE. The responder UE may receive from the initiator UE, based on the transmitting the PRS message associated with the responder UE, a post-PRS message associated with the initiator UE which may include at least an indication that the initiator UE receives the PRS message from the first responder UE. The responder UE may transmit to the initiator UE, based on the receiving of the post-PRS message associated with the initiator UE, a post-PRS message associated with the responder UE. The post-PRS message associated with the responder UE may be configured to include timing data related to a departure time of the PRS message associated with the responder UE and timing data related to an arrival time of the PRS message associated with the initiator UE. The responder UE may transmit data related to a location of the responder UE to the initiator UE.

BRIEF DESCRIPTION OF THE DRAWINGS

Like reference symbols in the various drawings indicate like elements, in accordance with certain example implementations.

DETAILED DESCRIPTION

Figure 1:
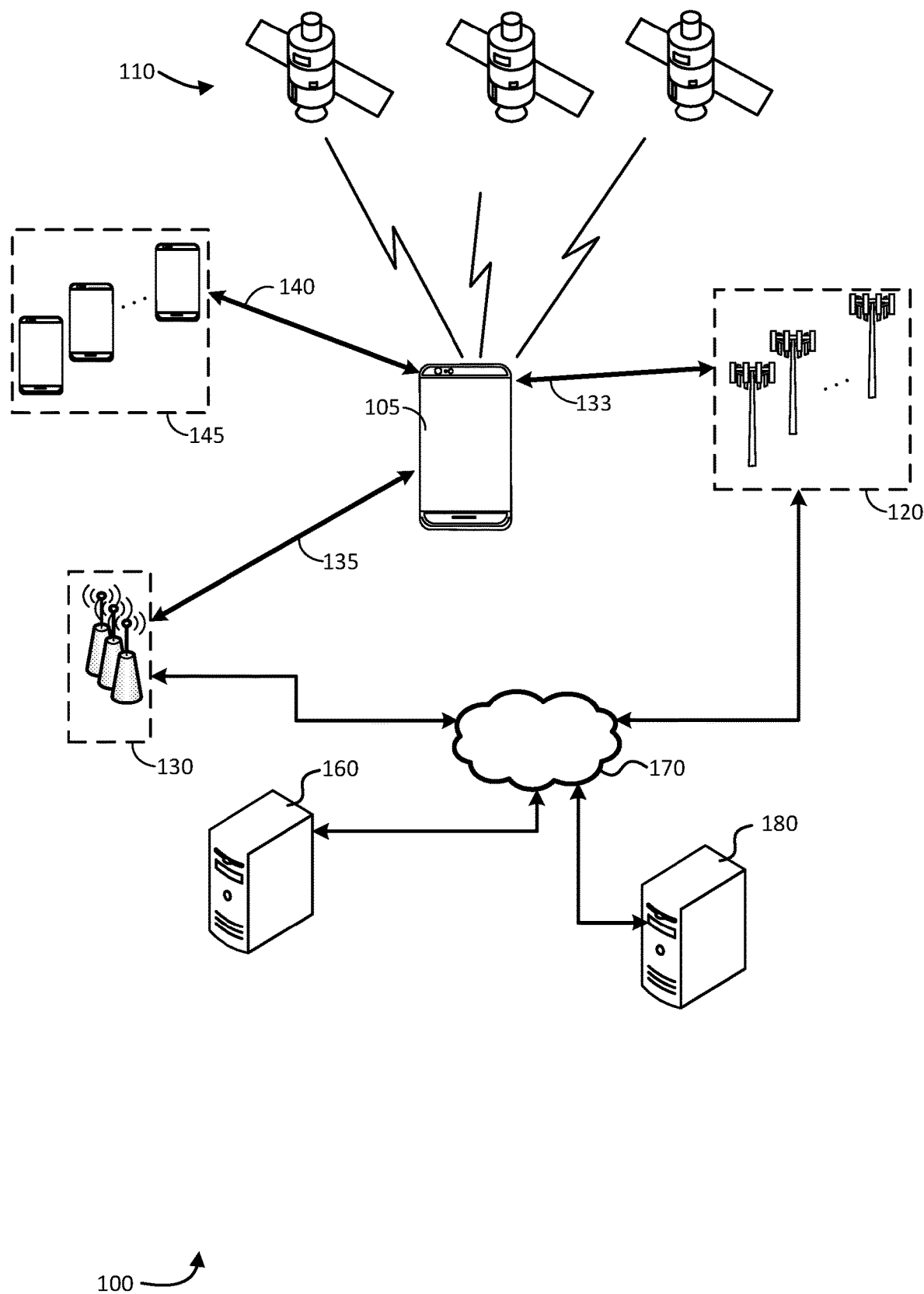
FIG. 1 is a diagram of a positioning system, according to an embodiment.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

In some aspects, a positioning reference signal (PRS) may be used to determine location information of user equipments (UEs). According to some positioning techniques, PRS may be exchanged between two UEs, the first UE may send its PRS to the second UE, and then the second UE may transmit its PRS to the first UE. The PRS exchange between the two UEs may happen within a certain time period so that clock drift error of the two UEs may be minimal. In some aspects, a PRS may be a signal that is generated based at least in part on a pseudo-noise (PN) sequence without a payload, and the transmission duration may be short (e.g., 33 microseconds). There may be a set of PN sequences generated and shared among the UEs in a network. A PRS may be identified by its identification (ID).

Some PRSs may use a large bandwidth in order to improve ranging. Positioning accuracy may increase as the bandwidth used by the PRS increases. As such, a PRS may be transmitted using an unlicensed spectrum for larger bandwidth. For example, a licensed spectrum may be associated with frequencies used by the wireless communication network in accordance with governing communication standards (e.g., 4G, 5G, etc.), and an unlicensed spectrum may be associated with frequencies outside of the licensed spectrum and for which LBT communication protocols may apply. To transmit a PRS using an unlicensed spectrum, a UE may need to perform a listen before talk (LBT) procedure to contend for access to the unlicensed electromagnet spectrum band (e.g., to determine whether a channel of the unlicensed electromagnetic spectrum band is available). In some aspects, the disclosed positioning technique may be applicable in communication systems that implement the vehicle-to-everything (V2X) standard.

In some aspects, the UEs in a network may be configured to broadcast basic safety messages (BSM). The broadcast of the BSM may occur periodically. In some aspects, the BSM may include information that indicates whether a UE is capable of performing PRS-based positioning. The BSM may also include information related to an approximate location of the UE. An initiator UE may be the UE that initiates a positioning session. A responder UE may be the UE that responds or reacts to the initiator UE. In some aspects, an initiator UE may identify a plurality of responder UEs based at least in part on the BSMs. For example, the initiator UE may select the plurality of responder UEs for a UE positioning session. A UE may be configured with a clock. In some aspects, UE timing of one UE with other UEs may not be perfectly synchronized due to certain level of synchronization error which may be in the nanoseconds level.

In some aspects, a group of UEs may participate in a positioning session. The group of UEs may include an initiator UE and multiple responder UEs. In some aspects, a communication between an initiator UE and a responder UE may include pre-PRS messages, PRS messages and post-PRS messages. The pre-PRS messages may be communicated during a pre-PRS stage, the PRS messages may be communicated during a PRS stage, and the post-PRS messages may be communicated during a post-PRS stage.

In some aspects, a positioning session may be initiated by an initiator UE based on the initiator UE determining that it is not certain about its location as related to a positioning system. For example, an initiator UE may determine that it is completely out of coverage with no network connectivity. In some aspects, when an initiator UE needs to determine its location, the initiator UE may select a responder UE from a plurality of nearby UEs based on positioning properties of the responder UE. The positioning properties of the responder UE may include one or more of a location of confidence of the responder UE, a direction that the responder UE may be moving, a velocity of the responder UE, and a location of the responder UE. In some aspects, an initiator UE may select and engage in a positioning session with a responder UE based on the responder UE moving in a direction different from a direction that the initiator UE is moving and based on the responder UE having a higher location confidence than the initiator UE. In some aspects, communication between an initiator UE and a responder UE in a positioning session described herein may not include communication to a base station or to a server computing system.

In some aspects, an initiator UE and a responder UE may use each other to determine their locations. For example, during a positioning session, an initiator UE may send one set of timing data related to a departure time and an arrival time and a position of the initiator UE to a responder UE to enable the responder UE to determine its location. Similarly, the responder UE may send another set of timing data related to a departure time and an arrival time and a position of the responder UE to the initiator UE to enable the initiator UE to determine its location. In some aspects, the responder UE may be configured to send range information relative to the initiator UE to the initiator UE. In some aspects, the initiator UE may be configured to send range information relative to the responder UE to the responder UE. The range information may indicate an approximate distance between an initiator UE and a responder UE.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 is a simplified illustration of a positioning system 100 in which a UE 105, location server 160, and/or other components of the positioning system 100 can use the techniques provided herein for a distributed positioning procedure for vehicular-UEs in out-of-coverage cellular networks, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
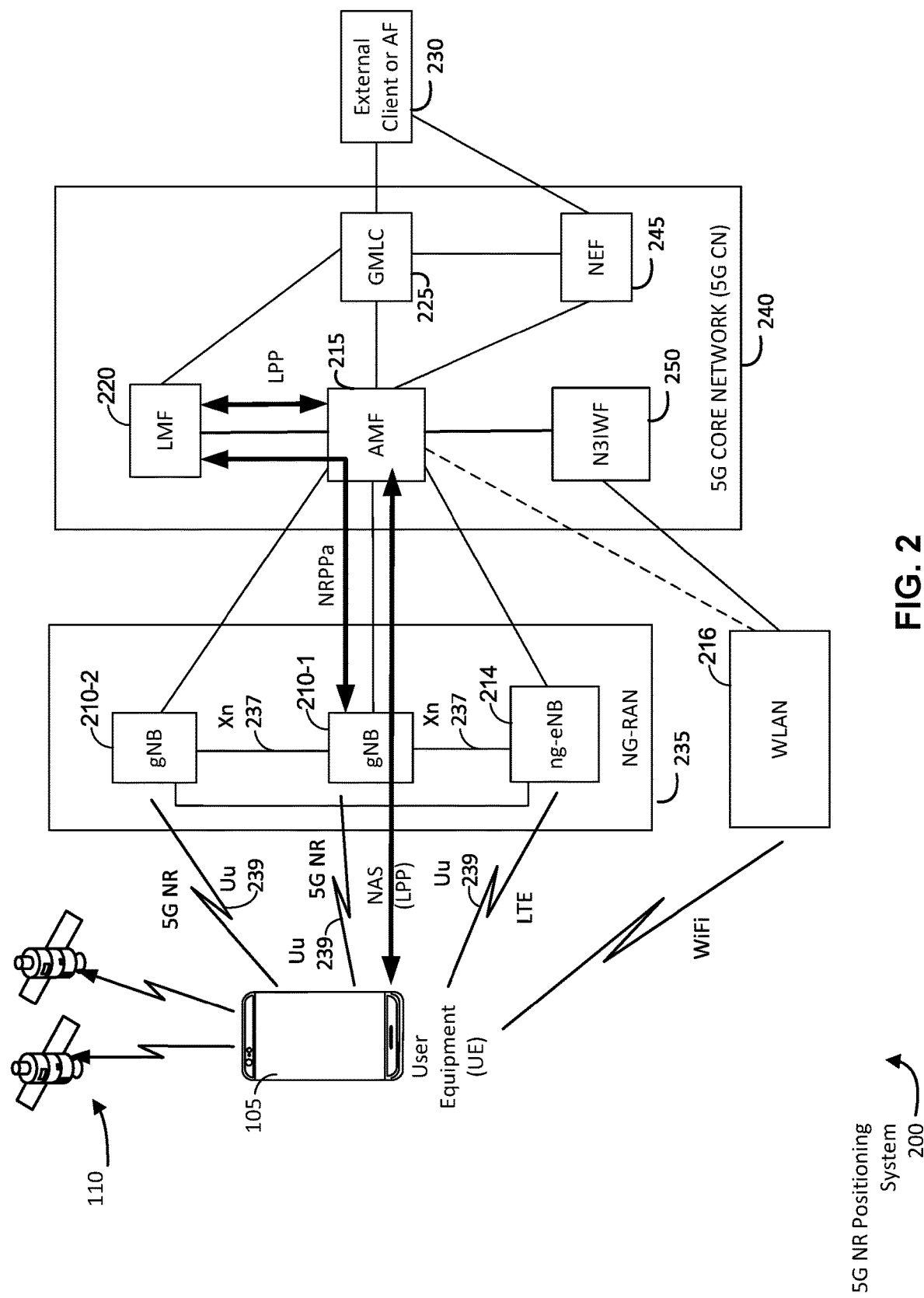
FIG. 2 is a diagram of a 5th Generation (5G) New Radio (NR) positioning system, illustrating an embodiment of a positioning system (e.g., the positioning system of FIG. 1) implemented within a 5G NR communication system, according to an embodiment.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to SGCN 240 may occur if WLAN 216 is a trusted WLAN for SGCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to SGCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AOA), angle of departure (AOD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as SGCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in SGCN 240. The NEF 245 may support secure exposure of capabilities and events concerning SGCN 240 and UE 105 to the external client 230, which may then be referred to as an Access Function (AF) and may enable secure provision of information from external client 230 to SGCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AOD, and/or ECID. The NRPPa protocol may be used to support positioning of UE 105 using network based position methods such as ECID, AOA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AOA, Receive Time-Transmission Time Difference (Rx-Tx), Differential AOA (DAOA), AOD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AOA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AOD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AOD and/or AOA.

Figure 3:
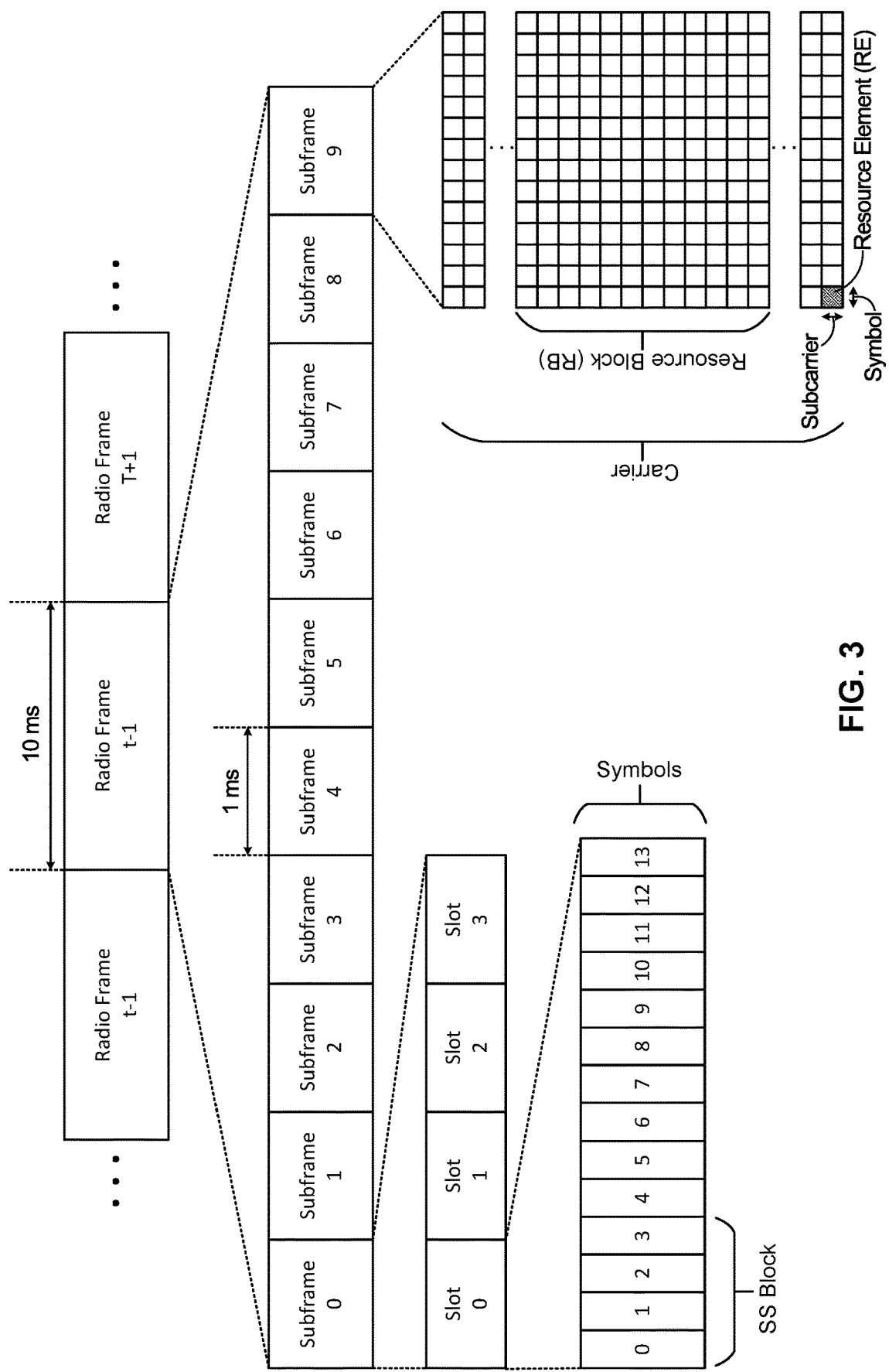
FIG. 3 is a diagram showing an example of a frame structure for NR and associated terminology, according to an embodiment.

FIG. 3 is a diagram showing an example of a frame structure for NR and associated terminology, which can serve as the basis for physical layer communication between the UE 105 and base stations, such as serving gNB 210-1. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 3 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 3. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

Figure 4:
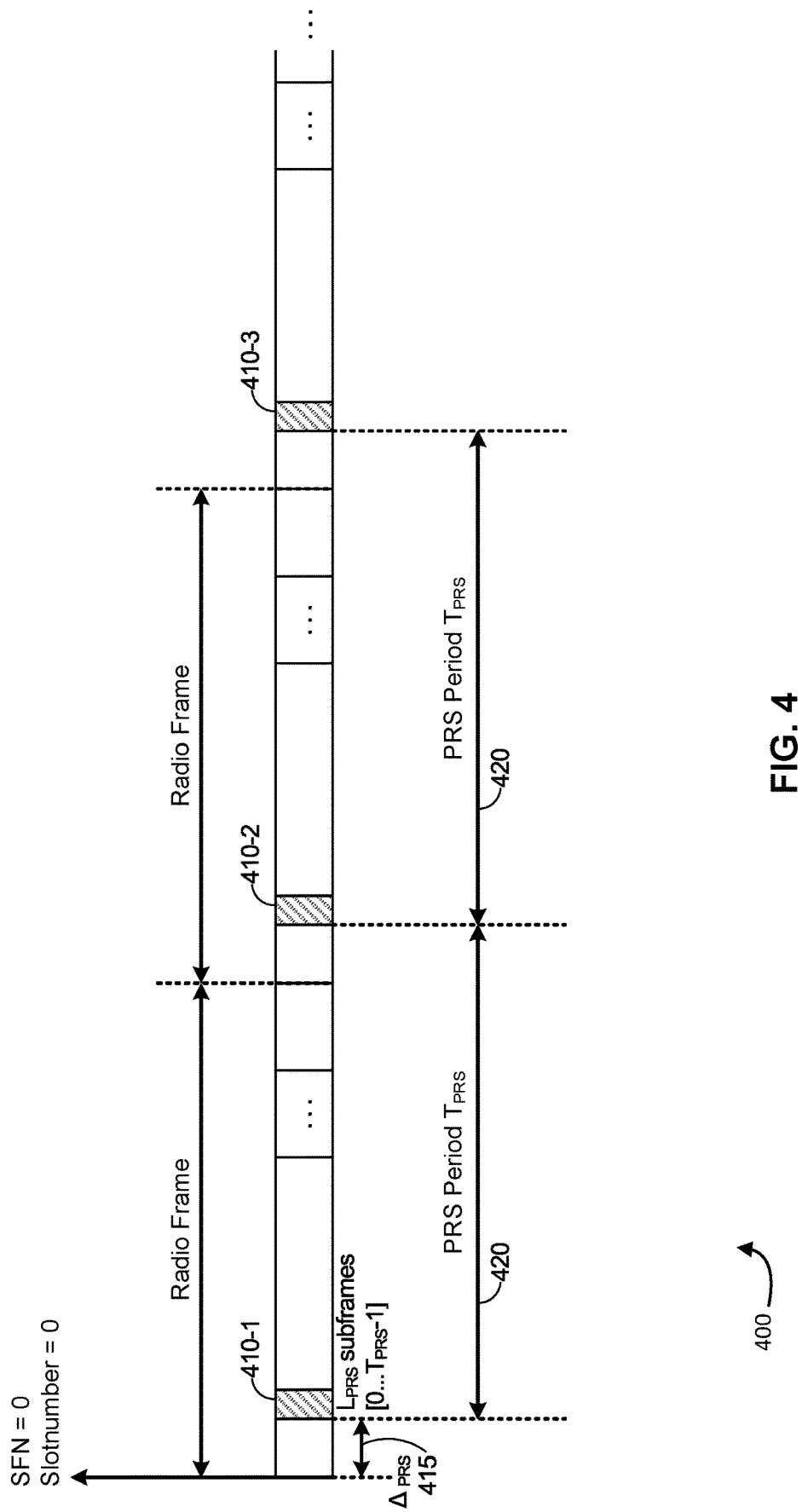
FIG. 4 is a diagram showing an example of a radio frame sequence with Positioning Reference Signal (PRS) positioning occasions, according to an embodiment.

FIG. 4 is a diagram showing an example of a radio frame sequence 400 with PRS positioning occasions. A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition." Subframe sequence 400 may be applicable to broadcast of PRS signals (DL-PRS signals) from base stations 120 in positioning system 100. The radio frame sequence 400 may be used in 5G NR (e.g., in 5G NR positioning system 200) and/or in LTE. Similar to FIG. 3, time is represented horizontally (e.g., on an X axis) in FIG. 4, with time increasing from left to right. Frequency is represented vertically (e.g., on a Y axis) with frequency increasing (or decreasing) from bottom to top.

FIG. 4 shows how PRS positioning occasions 410-1, 410-2, and 410-3 (collectively and generically referred to herein as positioning occasions 410) are determined by a System Frame Number (SFN), a cell-specific subframe offset (APRs) 415, a length or span of $L_{PRS}$ subframes, and the PRS Periodicity ($T_{PRS}$) 420. The cell-specific PRS subframe configuration may be defined by a "PRS Configuration Index," $I_{PRS}$, included in assistance data (e.g., TDOA assistance data), which may be defined by governing 3GPP standards. The cell-specific subframe offset (APRs) 415 may be defined in terms of the number of subframes transmitted starting from System Frame Number (SFN) 0 to the start of the first (subsequent) PRS positioning occasion.

A PRS may be transmitted by wireless nodes (e.g., base stations 120) after appropriate configuration (e.g., by an Operations and Maintenance (O&M) server). A PRS may be transmitted in special positioning subframes or slots that are grouped into positioning occasions 410. For example, a PRS positioning occasion 410-1 can comprise a number NPRS of consecutive positioning subframes where the number NPRS may be between 1 and 160 (e.g., may include the values 1, 2, 4 and 6 as well as other values). PRS occasions 410 may be grouped into one or more PRS occasion groups. As noted, PRS positioning occasions 410 may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). In some aspects, $T_{PRS}$ may be measured in terms of the number of subframes between the start of consecutive positioning occasions.

In some aspects, when a UE 105 receives a PRS configuration index $I_{PRS}$ in the assistance data for a particular cell (e.g., base station), the UE 105 may determine the PRS periodicity $T_{PRS}$ 420 and cell-specific subframe offset (APRs) 415 using stored indexed data. The UE 105 may then determine the radio frame, subframe, and slot when a PRS is scheduled in the cell. The assistance data may be determined by, for example, a location server (e.g., location server 160 in FIG. 1 and/or LMF 220 in FIG. 2), and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset (APRs) 415) relative to other cells in the network that use a different frequency. In SFN-synchronous networks all wireless nodes (e.g., base stations 120) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time. A UE 105 may determine the timing of the PRS occasions 410 of the reference and neighbor cells for TDOA positioning, if the UE 105 can obtain the cell timing (e.g., SFN or Frame Number) of at least one of the cells, e.g., the reference cell or a serving cell. The timing of the other cells may then be derived by the UE 105 based, for example, on the assumption that PRS occasions from different cells overlap.

Figure 5:
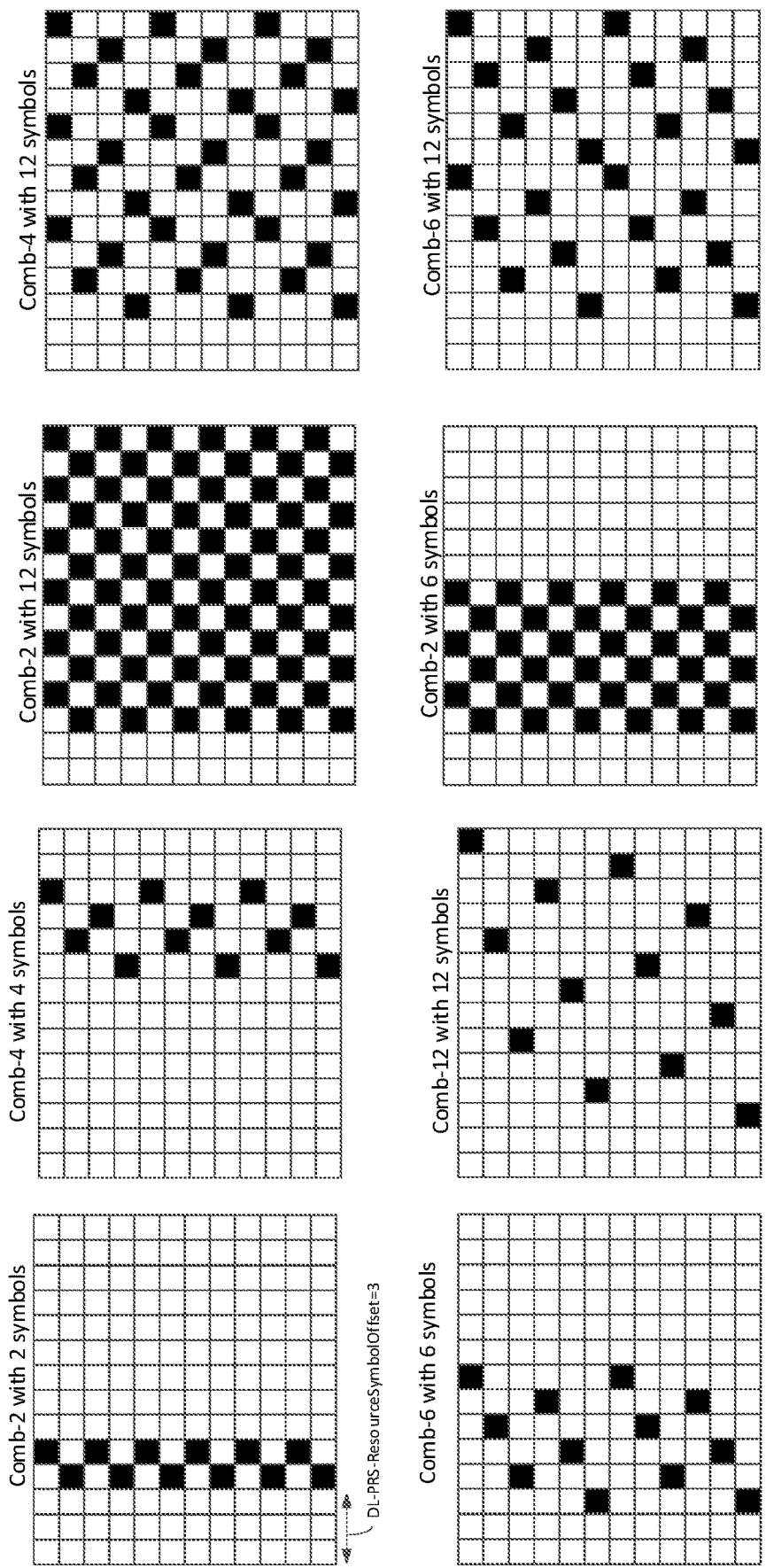
FIG. 5 is a diagram showing examples of different comb sizes using with different numbers of symbols, according to an embodiment.

With reference to the frame structure in FIG. 3, a collection of REs that are used for transmission of PRS is referred to as a "PRS resource." The collection of resource elements can span multiple RBs in the frequency domain and one or more consecutive symbols within a slot in the time domain, inside which pseudo-random Quadrature Phase Shift Keying (QPSK) sequences are transmitted from an antenna port of a TRP. In a given OFDM symbol in the time domain, a PRS resource occupies consecutive RBs in the frequency domain. The transmission of a PRS resource within a given RB has a particular comb size (also referred to as the "comb density"). A comb size "N" represents the subcarrier spacing (or frequency/tone spacing) within each symbol of a PRS resource configuration, where the configuration uses every Nth subcarrier of certain symbols of an RB. For example, for comb-4, for each of the four symbols of the PRS resource configuration, REs corresponding to every fourth subcarrier (e.g., subcarriers 0, 4, 8) are used to transmit PRS of the PRS resource. Comb sizes of comb-2, comb-4, comb-6, and comb-12, for example, may be used in PRS. Examples of different comb sizes using with different numbers of symbols are provided in FIG. 5.

A "PRS resource set" is a group of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). In addition, the PRS resources in a PRS resource set may have the same periodicity, a common muting pattern configuration, and the same repetition factor across slots. The periodicity may have a length selected from $2^m \cdot \{4, 5, 8, 10, 16, 20, 32, 40, 64, 80, 160, 320, 640, 1280, 2560, 5120, 10240\}$ slots, with µ=0, 1, 2, 3. The repetition factor may have a length selected from $\{1, 2, 4, 6, 8, 16, 32\}$ slots.

A PRS resource ID in a PRS resource set may be associated with a single beam (and/or beam ID) transmitted from a single TRP (where a TRP may transmit one or more beams). That is, each PRS resource of a PRS resource set may be transmitted on a different beam, and as such, a PRS resource (or simply "resource") can also be referred to as a "beam." Note that this does not have any implications on whether the TRPs and the beams on which PRS are transmitted are known to the UE.

In the 5G NR positioning system 200 illustrated in FIG. 2, a TRP (e.g., 210, 214, 216) may transmit frames, or other physical layer signaling sequences, supporting PRS signals (i.e. a DL-PRS) according to frame configurations as previously described, which may be measured and used for position determination of the UE 105. As noted, other types of wireless network nodes, including other UEs, may also be configured to transmit PRS signals configured in a manner similar to (or the same as) that described above. Because transmission of a PRS by a wireless network node may be directed to all UEs within radio range, the wireless network node may be considered to transmit (or broadcast) a PRS.

Figure 6:
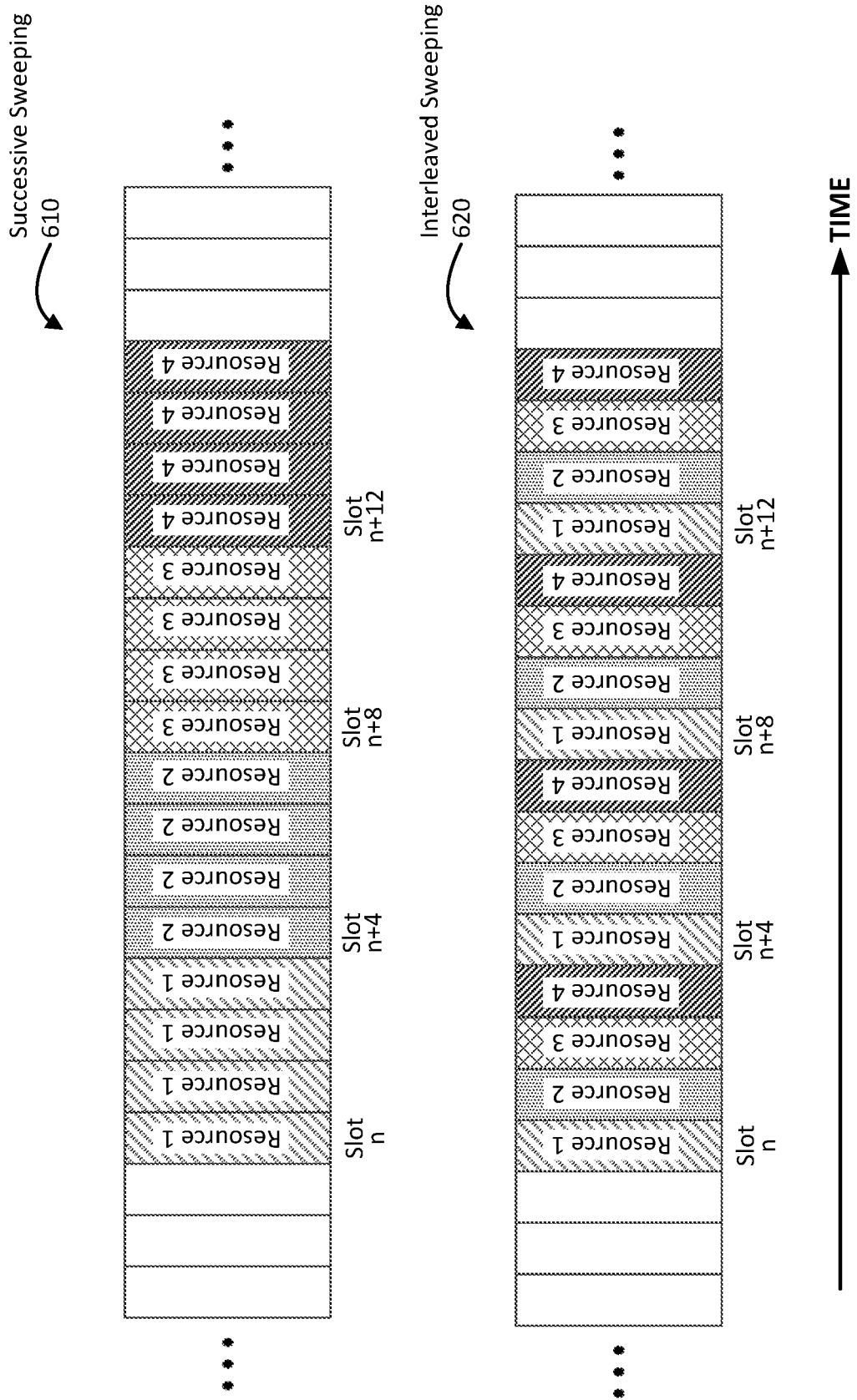
FIG. 6 is a timing diagram illustrating two different options for slot usage of a resource set, according to an embodiment.

FIG. 6 is a timing diagram illustrating two different options for slot usage of a resource set, according to an embodiment. Because each example repeats each resource four times, the resource set is said to have a repetition factor of four. Successive sweeping 610 comprises repeating a single resource (resource 1, resource 2, etc.) four times before proceeding to a subsequent resource. In this example, if each resource corresponds to a different beam of a TRP, the TRP repeats a beam for four slots in a row before moving to the next beam. Because each resource is repeated in successive slots (e.g., resource 1 is repeated in slots n, n+1, n+2, etc.), the time gap is said to be one slot. On the other hand, for interleaved sweeping 620, the TRP may move from one beam to the next for each subsequent slot, rotating through four beams for four rounds. Because each resource is repeated every four slots (e.g., resource 1 is repeated in slots n, n+4, n+8, etc.), the time gap is said to be one slot. Of course, embodiments are not so limited. Resource sets may comprise a different amount of resources and/or repetitions. Moreover, as noted above, each TRP may have multiple resource sets, multiple TRPs may utilize a single FL, and a UE may be capable of taking measurements of PRS resources transmitted via multiple FLs.

Thus, to obtain PRS measurements from PRS signals sent by TRPs and/or UEs in a network, the UE can be configured to observe PRS resources during a period of time called a measurement period. That is, to determine a position of the UE using PRS signals, a UE and a location server (e.g., LMF 220 of FIG. 2) may initiate a location session in which the UE is given a period of time to observe PRS resources and report resulting PRS measurements to the location server. As described in more detail below, this measurement period may be determined based on the capabilities of the UE.

To measure and process PRS resources during the measurement period, a UE can be configured to execute a measurement gap (MG) pattern. The UE can request a measurement gap from a serving TRP, for example, which can then provide the UE with the configuration (e.g., via Radio Resource Control (RRC) protocol).

As noted, a UE may be configured to execute an MG pattern to measure and process PRS resources of a PRS resource set outside an active DL bandwidth part (BWP) via which the UE sends and receives data with a serving TRP. To allow the network to configure the UE in a manner that accommodates the processing and buffering capabilities of the UE (which may be dynamic), the UE may provide to the network (e.g., a TRP or location server) capabilities related to PRS processing. The various parameters of the MG pattern can be configured in view of these capabilities.

Figure 7:
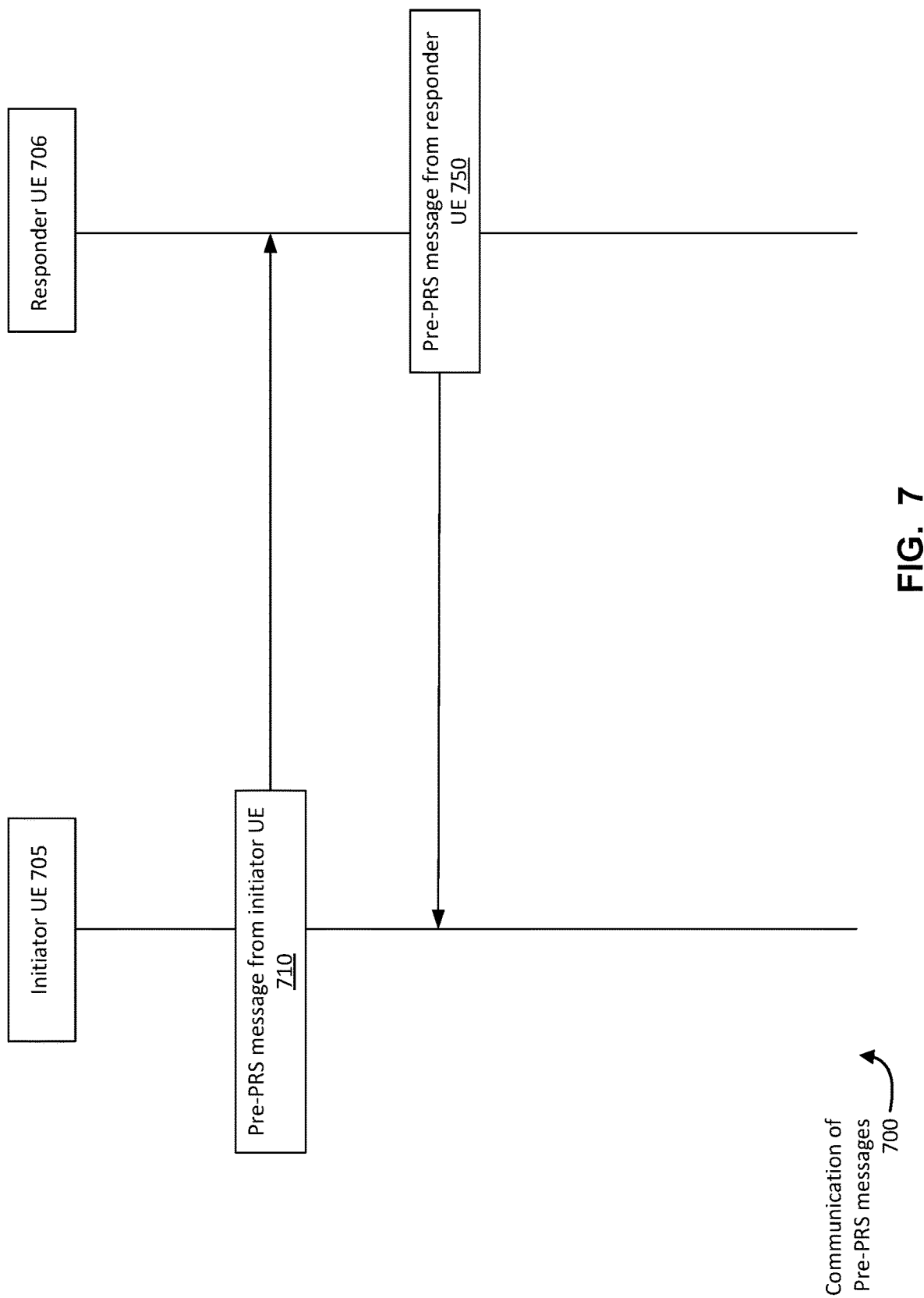
FIG. 7 is a timing diagram illustrating an example of communication that may occur during a pre-PRS stage, according to an embodiment.

FIG. 7 is a timing diagram illustrating an example of communication that may occur during a pre-PRS stage, according to some aspects. The pre-PRS messages communicated during the pre-PRS stage may be performed using a licensed spectrum. In some aspects, an initiator UE may be configured to perform UE positioning sessions with multiple responder UEs such as, for example, to triangulate a position of the initiator UE with respect to the multiple responder UEs. In some aspects, the initiator UE may perform pairwise operations with each of the multiple responder UEs.

The communication example in timing diagram 700 may include pre-PRS messages communicated between an initiator UE 705 and a responder UE 706. The communication may be initiated by the initiator UE 705 and may be based on information included the BSM transmitted by the responder UE 706. The UE 705 may be configured to transmit the pre-PRS message 710 to the responder UE 706. The pre-PRS message 710 may be used by the initiator UE 705 to indicate the PRS ID of the initiator UE 705, timing information when the initiator UE 705 transmits its PRS message, frequency information used by the initiator UE 705 to transmit its PRS message, and the PRS ID that the initiator UE 705 specifies for the responder UE 706 to use.

In some aspects, when the PRS ID of the initiator UE 705 is fixed over multiple PRS exchanges, the initiator UE 705 may transmit an ID associated with the current PRS exchange for each of the multiple PRS exchanges. In some aspects, the timing information when the initiator UE 705 transmits its PRS message may include a time determined by the initiator UE 705. Optionally, the timing information when the initiator UE 705 transmits its PRS message may include a time determined at upper layer such as, for example, an application layer. In some aspects, the timing information when the initiator UE 705 transmits its PRS message may include information about a time slot number nearest to the time determined by the initiator UE 705 when to transmit its PRS message. In some aspects, the time slot may be subjected to a local clock error.

In some aspects, the frequency information used by the initiator UE 705 to transmit the PRS message may include a frequency selected from an available set of total bandwidth. In some aspects, the frequency information may include a frequency selected by sensing an interference and selecting one or more channels associated with an average reference signal received power (RSRP) interference being less than a threshold. In some aspects, the initiator UE 705 may broadcast the pre-PRS message 710. Optionally, the initiator UE 705 may unicast the pre-PRS message 710 with RRC connection. When unicast is used, the reliability of the unicast may need to be greater than a predetermined threshold. Reliability of the unicast may be improved using conventional techniques.

Based on the responder UE 706 having received the pre-PRS message 710 from the initiator UE 705, the responder UE 706 may transmit its pre-PRS message 750 to the initiator UE 705. The pre-PRS message 750 may be used by the responder UE 706 to indicate timing information when the responder UE 706 transmits its PRS message to the initiator UE 705, the PRS ID used by the responder UE 706, and the frequency information used by the responder UE 706 to transmit its PRS message to the initiator UE 705.

In some aspects, the timing information indicated by the responder UE 706 when it transmits its PRS message to the initiator UE 705 may include a time determined by the responder UE 706 when to transmit its PRS message based on the timing information provided by the initiator UE 705 and an alpha value. The alpha value may be a number associated with hardware constraints and an interference level. The alpha value may be low when a PRS processing time is small and an ambient temperature is low. The alpha value may be high when the PRS processing time is high and the ambient interference is high. In some aspects, the timing information when the responder UE 706 transmits its PRS message may include information about a time slot number that is closest to the time determined by the responder UE 706 when to transmit its PRS message. The time determined by the responder UE 706 when to transmit its PRS message may be subjected to a local clock error.

In some aspects, the PRS ID used by the responder UE 706 may be determined by the UE 706. Alternatively, the PRS ID used by the responder UE 706 may be the same as the PRS ID transmitted by the initiator UE 705. In some aspects, when a fixed PRS ID is used by the initiator UE 705 over multiple PRS exchanges, the responder UE 706 may use the fixed PRS ID as its PRS ID. In some aspects, the responder UE 706 may broadcast the pre-PRS message 750. Optionally, the responder UE 706 may unicast the pre-PRS message 750 with RRC connection. When unicast is used, the reliability of the unicast may need to be greater than a predetermined threshold. Reliability of the unicast may be improved using conventional techniques.

Figure 8:
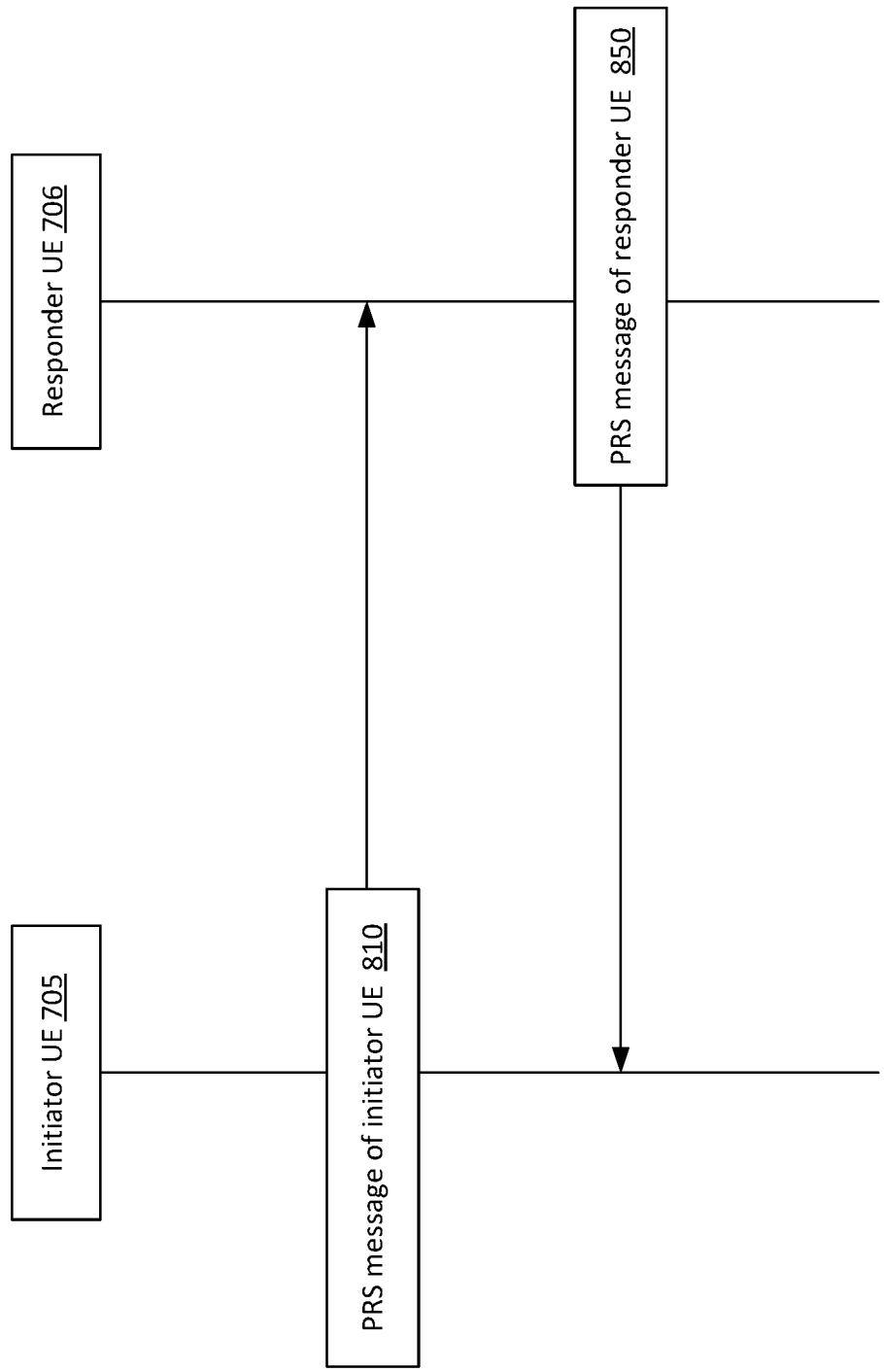
FIG. 8 is a timing diagram illustrating an example of communication that may occur during a PRS stage, according to an embodiment.

FIG. 8 is a timing diagram illustrating an example of communication that may occur during a PRS stage, according to some embodiments. In some aspects, the PRS messages communicated during the PRS stage may be performed in an unlicensed spectrum and may be subjected to LBT. Based on the initiator UE 705 having received the pre-PRS message 750 from responder UE 706, both the initiator UE 705 and the responder UE 706 are aware of the expected timing of the PRS message from each other, the PRS ID used by each, and any ID associated with the current PRS exchange.

In some aspects, the initiator UE 705 may be configured to broadcast the PRS message 810 to the responder UE 706 based on the timing information included in its pre-PRS message 710 (shown in FIG. 7). The PRS message 810 may be used by the initiator UE 705 to transmit its PRS to the responder UE 706. The initiator UE 705 may use the PRS ID and the frequency information included in its pre-PRS message 710 to transmit the PRS message 810 to the responder UE 706.

Optionally, the initiator UE 705 may broadcast the PRS message 810 based on the timing information included in its pre-PRS message 710 with a random waiting time due to LBT constraints associated with using an unlicensed spectrum. In some aspects, the LBT may be performed as CAT 2 LBT with fixed window CCA. In some aspects, the LBP may be performed as CAT 4 LBT with varying window CCA.

In some aspects, the initiator UE 705 may be configured to store the time instances (e.g., departure time) when its PRS message 810 is transmitted to the responder UE 706. In some aspects, the time instances may be subjected to local clock error.

In some aspects, the responder UE 706 may be configured to store the time instances (e.g., arrival time) when it receives the PRS message 810 from the initiator UE 705. In some aspects, the time instances may be subjected to local clock error.

Based on the responder UE 706 having received the PRS message 810 from the initiator UE 705, the responder UE 706 may be configured to broadcast the PRS message 850 to the initiator UE 705 based on the timing information included in its pre-PRS message 750 (shown in FIG. 7). The PRS message 850 may be used by the responder UE 706 to transmit its PRS to the initiator UE 705.

In some aspects, the responder UE 706 may be configured to store the time instances (e.g., departure time) when its PRS message 850 is transmitted to the initiator UE 705. In some aspects, the time instances may be subjected to local clock error.

Optionally, the responder UE 706 may broadcast the PRS message 850 based on the timing information included in its pre-PRS message 750 with a random waiting time due to LBT constraints associated with using an unlicensed spectrum. In some aspects, the LBT may be performed as CAT 2 LBT with fixed window CCA. In some aspects, the LBP may be performed as CAT 4 LBT with varying window CCA.

In some aspects, the initiator UE 705 may be configured to store the time instances (e.g., arrival time) when it receives the PRS message 850 from the responder UE 706. In some aspects, the time instances may be subjected to local clock error. In some aspects, it may be possible that the initiator UE 705 does not receive the PRS message 850 from the responder UE.

Figure 9:
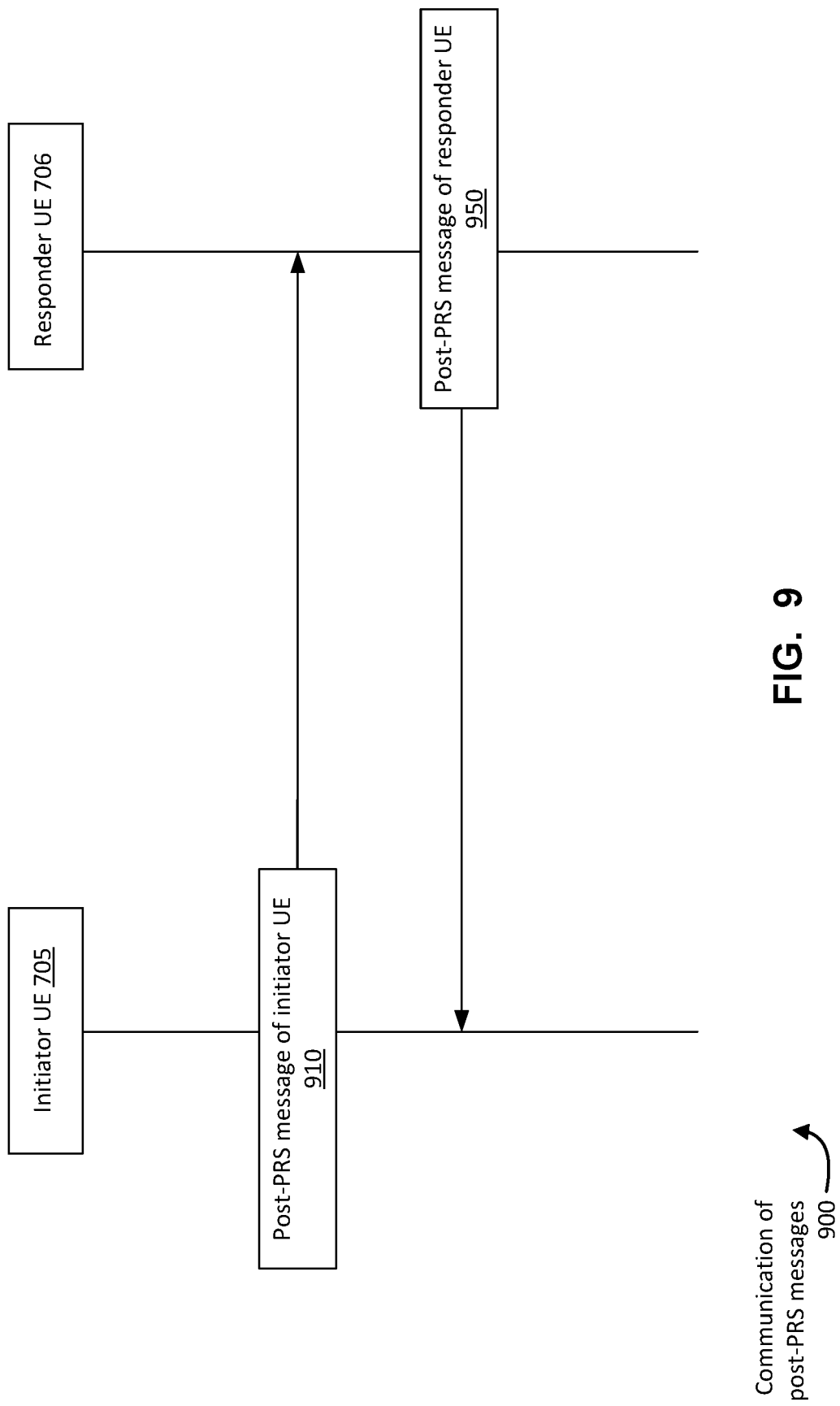
FIG. 9 is a timing diagram illustrating an example of communication that may occur during a post-PRS stage, according to an embodiment.

FIG. 9 is a timing diagram illustrating an example of communication that may occur during a post-PRS stage, according to some embodiments. In some aspects, the post-PRS messages communicated during the post-PRS stage may be performed using a licensed spectrum. Based on the initiator UE 705 having received the PRS message 850 from responder UE 706, the initiator UE 705 may be configured to transmit the post-PRS message 910 to the responder UE 706. The post-PRS message 910 may be used by the initiator UE 705 to indicate whether the initiator UE 705 receives the PRS message 850 from the responder UE 706.

In some aspects, based on the initiator UE 705 having received the PRS message 850, the initiator UE 705 may be configured to determine the departure time of PRS message 810 and the arrival time of PRS message 850 (shown in FIG. 8). In some aspects, the arrival time of the PRS message 850 may be determined as a relative time with respect to the departure time of the PRS message 810. In some aspects, the relative time may be approximated to a closest multiple of time scale shared by the initiator UE 701 and the responder UE 706.

In some aspects, the post-PRS message 910 may also be used by the initiator UE 705 to indicate the departure time of the PRS message 810 of the initiator UE 705 and the arrival time of PRS message 850 of the responder UE 706. In some aspects, the post-PRS message 910 may also be used to indicate a location of the initiator UE 705 at the arrival time of the PRS message 850 of the responder UE 706. The location of the initiator UE 705 may be included in the post-PRS message 910 even when the location of the initiator UE 705 may not be accurate. The departure time of the PRS message 810 and the arrival time of PRS message 850 and the location of the initiator UE 705 may be included in the post-PRS message 910 to enable the responder UE 706 to position itself in a situation when the responder UE needs to determine its location relative to the location of the initiator UE 705.

It may be noted that when the initiator UE 705 does not receive the PRS message 850 from the responder UE 706, the post-PRS message 910 may indicate that the PRS message 850 is not received. In some aspects, when the initiator UE 705 does not receive the PRS message 850, the initiator UE 705 and the responder UE 706 may initiate anther positioning session or PRS exchange.

Based on receiving the post-PRS message 910 from the initiator UE 705, the responder UE 706 may be configured to transmit its post-PRS message 950 to the initiator UE 705. The responder UE 706 may use the post-PRS message 950 to indicate whether it receives the PRS message 810 from the initiator UE 705, the departure time of the PRS message 850 of responder UE 706, the arrival time of the PRS message 810 of the initiator UE 705, and the location of responder UE 706 at the departure time of the PRS message 850 of the responder UE 706.

In some aspects, the departure time of the PRS message 850 of the responder UE 706 may be determined as a relative time with respect to the arrival time of the PRS message 810 of the initiator UE 705. In some aspects, the relative time may be approximated to the closest multiple of time scale shared by the initiator UE 705 and the responder UE 706. In some aspects, when the post-PRS message 910 indicates that the initiator UE 705 did not receive the PRS message 850 from the responder UE 706, the departure time of the PRS of the responder UE 706 in the post-PRS message 950 may be given a "null" value.

In some aspects, the communication shown in FIG. 7, FIG. 8 and FIG. 9 between the initiator UE 705 and the responder UE 706 during the pre-PRS stage, the PRS stage and the post-PRS stage may be repeated in multiple cycles. In some aspects, a cycle value may be determined by the initiator UE 705, and a cycle counter may be maintained by the initiator UE 705. In some aspects, the cycle value may be determined by an upper layer such as, for example, an application layer. In some aspects, the cycle value may be determined based on velocities of the initiator UE and the responder UE and angular changes between the initiator UE and the responder UE. For example, when the initiator UE 705 and the responder UE 706 are moving in the same direction, the angular changes may be minimal, and therefore it may not be useful to have a high number of cycles. However, when the responder UE 706 is moving in a direction away from the initiator UE 705, multiple geometries and angular changes may result between a position of the initiator UE 705 and a position of the responder UE 706. As the separation in distance between the initiator UE 705 and the responder UE 706 increases, the timing data (e.g., departure time of one reference signal and arrival time of another reference signal) associated with the responder UE 706 and the position of the responder UE 706 may be different at time "t1" as compared to the same data at time "t2" and "t3". In this scenario, it may be useful for the initiator UE 705 to determine its location using a high number of cycles.

The cycle value may be transmitted by the initiator UE 705 to the responder UE 706 using its pre-PRS message 710 (shown in FIG. 7). The cycle value may be confirmed by the responder UE 706 using its pre-PRS message 750. In some aspects, the number of cycles may enable the initiator UE 705 to determine its position at different times based on different positions of the responder UE 706.

At the end of each cycle, the cycle counter may be incremented by the initiator UE 705 based on successful receipt of the post-PRS message 950 from the responder UE 706. The initiator UE 705 may then determine its location. In some aspects, the determination of the location of the initiator UE 705 may be performed based at least in part on the departure time of the post-PRS message 910 and the arrival time of the post-PRS message 950 and the location of the responder UE 706 at the departure time of the PRS message 850 using any currently available techniques including, for example, using the Kalman filter. The cycle of pre-PRS message, PRS message and post-PRS message may continue with the next cycle. In some aspects, the initiator UE 705 may determine when to start the next cycle. In some aspects, the start of the next cycle may be determined by an upper layer. When the cycle counter reaches or exceeds the cycle value and after receiving the post-PRS message 950 from the responder UE 706, the positioning session between the initiator UE 705 and the responder UE 706 may end.

It may be noted that the initiator UE 705 may initiate multiple positioning sessions with multiple responder UEs. For example, other than having a positioning session with the responder UE 706, the UE 705 may have similar positioning sessions with two other responder UEs, each independently of one another, in a pairwise approach. In some aspects, the multiple positioning sessions with multiple responder UEs may occur almost simultaneously.

Figure 10:
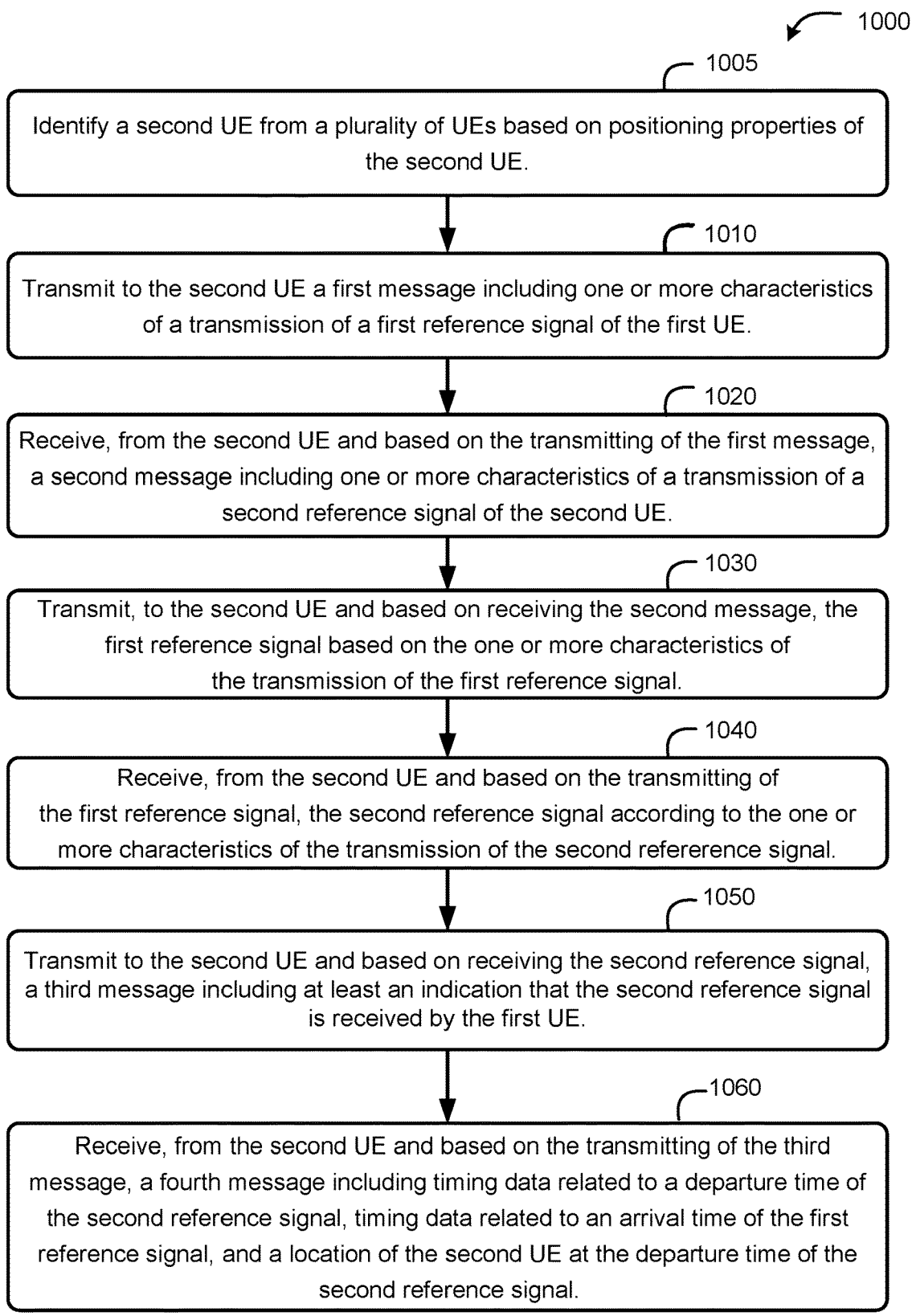
FIG. 10 is a flow diagram of an example process that may be performed by a UE that initiates a positioning session, according to an embodiment
Figure 12:
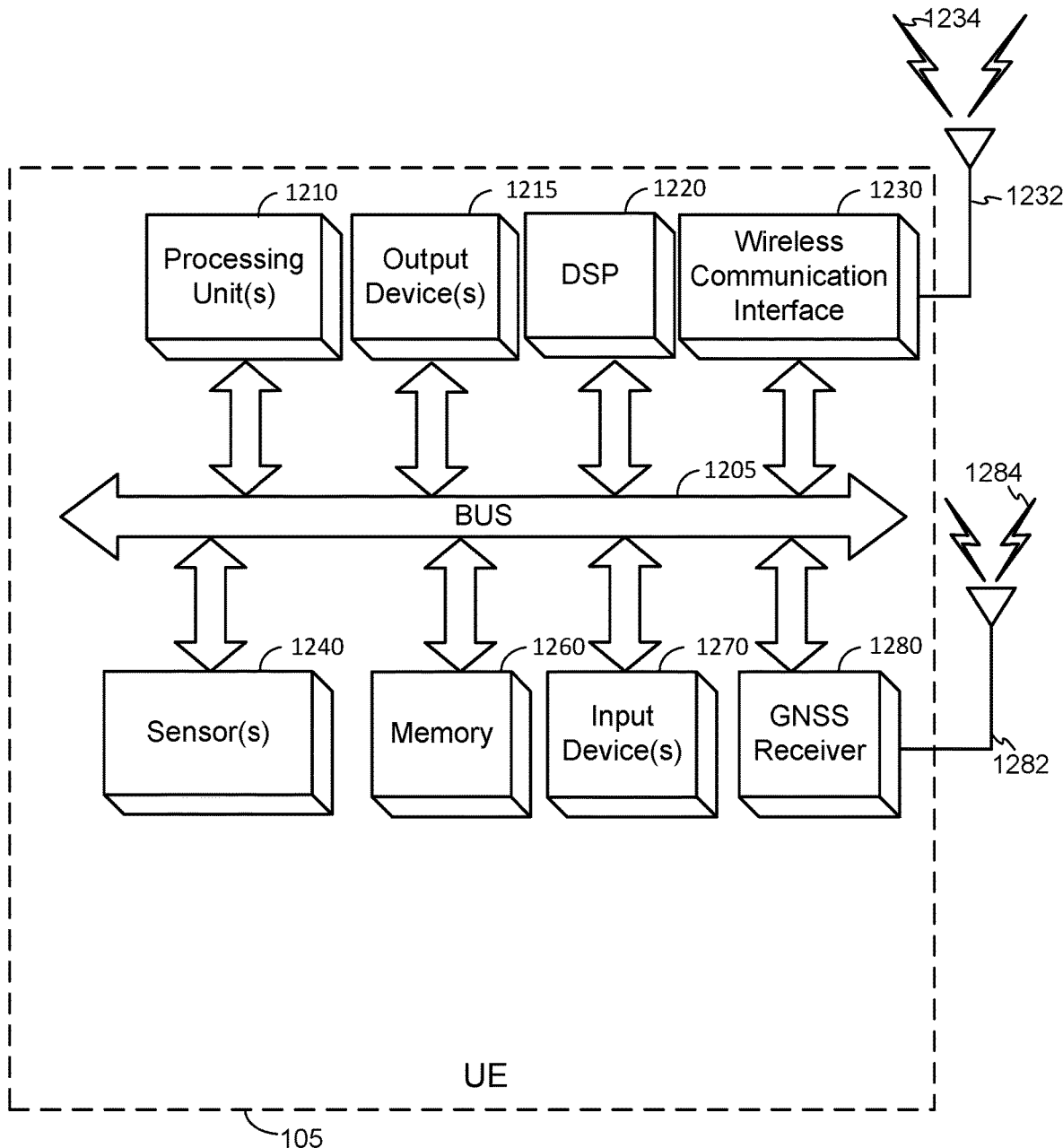
FIG. 12 is a block diagram of an embodiment of a UE, which can be utilized in embodiments as described herein.

FIG. 10 is a flow diagram of an example process that may be performed by a UE that initiates a positioning session, according to an embodiment. A first UE may correspond to a UE that initiates the positioning session. A second UE may correspond to a UE that responds to the first UE. A first message may correspond to a pre-PRS message from the first UE. A second message may correspond to a pre-PRS message from the second UE. A third message may correspond to a post-PRS message from the first UE. A fourth message may correspond to a post-PRS message from the second UE. Means for performing the functionality illustrated in one or more of the blocks shown in FIG. 10 may be performed by hardware and/or software components of a UE. Example components of a UE are illustrated in FIG. 12 which are described in more detail below.

The operations may be performed by a first UE. At block 1005, the functionality comprises identifying a second UE by the first UE from a plurality of UEs that may be positioned near a position of the first UE. The second UE may be identified based on its positioning properties which may include a direction that the second UE is moving, its velocity, its location confidence and its location. In some aspects, the positioning properties may be received from the BSM of the second UE. For example, the second UE may be identified because it is moving in a different direction as the first UE. Means for performing functionality at block 1005 may comprise the memory 1260, the processing unit(s) 1210, the wireless communication interface 1230, the antenna 1232, and/or other components of a UE, as illustrated in FIG. 12.

At block 1010, the functionality comprises transmitting, by the first UE to the second UE, a first message. The first message (also referred to as a pre-PRS message) may be configured to include one or more characteristics of a transmission of a first reference signal of the first UE. The one or more characteristics of the transmission of the first reference signal may include an identification (ID) of the first reference signal, timing data indicating a time when the first UE transmits the first reference signal to the second UE and frequency data indicating a frequency used by the first UE to transmit the first reference signal to the second UE. The transmission described in block 1010 may be performed using a licensed spectrum. The transmission may be a broadcast. Means for performing functionality at block 1010 may comprise the memory 1260, the processing unit(s) 1210, the wireless communication interface 1230, the antenna 1232, and/or other components of a UE, as illustrated in FIG. 12.

At block 1020, the functionality comprises receiving, from the second UE and based on the transmitting of the first message, a second message including one or more characteristics of a transmission of a second reference signal of the second UE. The one or more characteristics of the transmission of the second reference signal may include an ID of the second reference signal, timing data indicating a time when the second UE transmits the second reference signal to the first UE, frequency data indicating a frequency used by the second UE to transmit the second reference signal to the first UE. Means for performing the functionality at block 1020 may comprise processing unit(s) 1210, wireless communication interface 1230, antenna 1232, and/or other components of a UE, as illustrated in FIG. 12.

At block 1030, the functionality comprises transmitting, to the second UE and based on receiving the second message from the second UE, the first reference signal based on the one or more characteristics of the transmission of the first reference signal. The transmission of the first reference signal to the second UE may be performed using an unlicensed spectrum and may be subjected to LBT. Means for performing the functionality at block 1030 may comprise the memory 1260, the processing unit(s) 1210, the wireless communication interface 1230, the antenna 1232, and/or other components of a UE, as illustrated in FIG. 12.

At block 1040, the functionality comprises receiving, from the second UE and based on the transmitting of the first reference signal, a second reference signal based on the one or more characteristics of the transmission of the second reference signal. The second reference signal may be received via an unlicensed spectrum. Means for performing the functionality at block 1040 may comprise processing unit(s) 1210, wireless communication interface 1230, antenna 1232, and/or other components of a UE, as illustrated in FIG. 12.

At block 1050, the functionality comprises transmitting to the second UE and based on receiving the second reference signal, a third message including at least an indication whether the second reference signal is received by the first UE. In some aspects, the third message may further include timing data related to a departure time of the first reference signal and timing data related to an arrival time of the second reference signal. The third message may be transmitted using a licensed spectrum. Means for performing the functionality at block 1050 may comprise the memory 1260, the processing unit(s) 1210, the wireless communication interface 1230, the antenna 1232, and/or other components of a UE, as illustrated in FIG. 12.

At block 1060, the functionality comprise receiving, from the second UE and based on the transmitting of the third message, a fourth message including timing data related to a departure time of the second reference signal, timing data related to an arrival time of the first reference signal, and a location of the second UE at the departure time of the second reference signal. The fourth message may be received over a licensed spectrum. Means for performing the functionality at block 1040 may comprise processing unit(s) 1210, wireless communication interface 1230, antenna 1232, and/or other components of a UE, as illustrated in FIG. 12.

Figure 11:
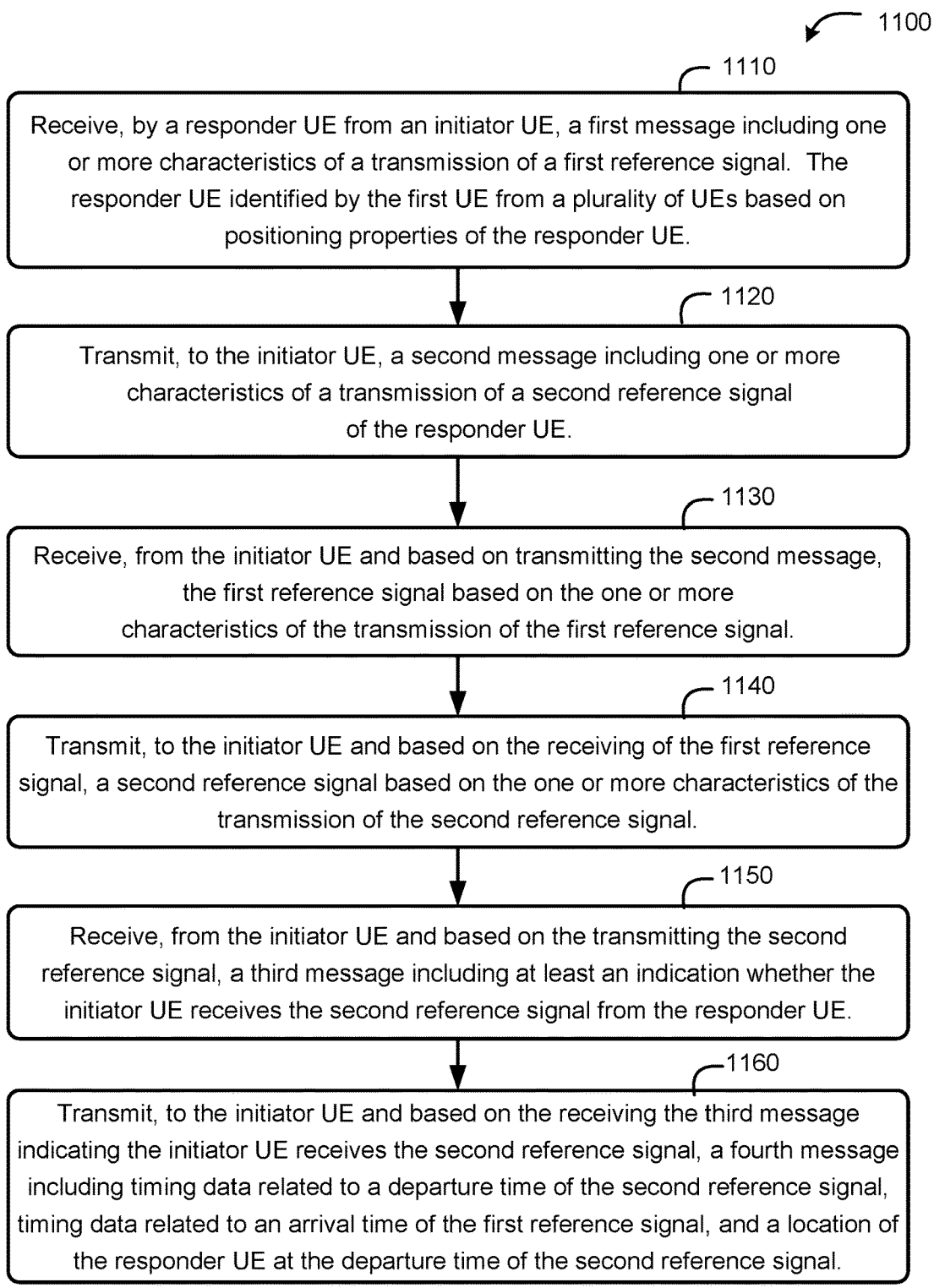
FIG. 11 is a flow diagram of an example process that may be performed by a UE that responds to the UE that initiates the positioning session, according to an embodiment.

FIG. 11 is a flow diagram of an example process that may be performed by a responder UE in a positioning session, according to some aspects. The positioning session may be initiated by an initiator UE based on positioning properties of the responder UE. Means for performing the functionality illustrated in one or more of the blocks shown in FIG. 11 may be performed by hardware and/or software components of a UE. Example components of a UE are illustrated in FIG. 12 which are described in more detail below.

At block 1110, the functionality comprises receiving, from the initiator UE, a first message including one or more characteristics of a transmission of a first reference signal of the initiator UE. The one or more characteristics of the transmission of the first reference signal may include an ID of the first reference signal, timing data related to a time slot used by the initiator UE to send the first reference signal to the responder UE, and frequency data related to a frequency used by the initiator UE to send the first reference signal to the responder UE. Means for performing the functionality at block 1110 may comprise processing unit(s) 1210, wireless communication interface 1230, antenna 1232, and/or other components of a UE, as illustrated in FIG. 12.

At block 1120, the functionality comprises transmitting, to the initiator UE, a second message including one or more characteristics of a transmission of a second reference signal of the responder UE. The one or more characteristics of the transmission of the second reference signal may include an ID of the second reference signal, timing data related to a time slot used by the responder UE to send the second reference signal to the initiator UE, and frequency data related to a frequency used by the responder UE to send the second reference signal to the initiator UE. Means for performing the functionality at block 1120 may comprise processing unit(s) 1210, wireless communication interface 1230, antenna 1232, and/or other components of a UE, as illustrated in FIG. 12.

At block 1130, the functionality comprises receiving, from the initiator UE and based on transmitting the second message, the first reference signal from the initiator UE based on the one or more characteristics of the transmission of the first reference signal. The first reference signal may be received using an unlicensed spectrum. Means for performing the functionality at block 1130 may comprise processing unit(s) 1210, wireless communication interface 1230, antenna 1232, and/or other components of a UE, as illustrated in FIG. 12.

At block 1140, the functionality comprises transmitting, to the initiator UE and based on the receiving of the first reference signal, a second reference signal of the responder UE based on the one or more characteristics of the transmission of the second reference signal. The second reference signal may be transmitted using an unlicensed spectrum and may be subjected to LBT. Means for performing the functionality at block 1140 may comprise processing unit(s) 1210, wireless communication interface 1230, antenna 1232, and/or other components of a UE, as illustrated in FIG. 12.

At block 1150, the functionality comprises receiving, from the initiator UE and based on the transmitting the second reference signal, a third message including at least an indication that the second reference signal is received by the initiator UE. The third message may be received using a licensed spectrum. Means for performing the functionality at block 1150 may comprise processing unit(s) 1210, wireless communication interface 1230, antenna 1232, and/or other components of a UE, as illustrated in FIG. 12.

At block 1160, the functionality comprises transmitting, to the initiator UE and based on the receiving the third message, a fourth message including timing data related to a departure time of the second reference signal, timing data related to an arrival time of the first reference signal, and location of the responder UE at the departure time of the second reference signal. The fourth message may be transmitted using a licensed spectrum. Means for performing the functionality at block 1160 may comprise processing unit(s) 1210, wireless communication interface 1230, antenna 1232, and/or other components of a UE, as illustrated in FIG. 12.

FIG. 12 illustrates an embodiment of a UE 105, which can be utilized as described herein above (e.g., in association with FIGS. 7-11). For example, the UE 105 can perform one or more of the functions of the method shown in FIG. 10 and FIG. 11. It should be noted that FIG. 12 is meant only to provide a generalized illustration of various components, any or all of which may be utilized as appropriate. It can be noted that, in some instances, components illustrated by FIG. 12 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 12.

The UE 105 is shown comprising hardware elements that can be electrically coupled via a bus 1205 (or may otherwise be in communication, as appropriate). The hardware elements may include a processing unit(s) 1210 which can include without limitation one or more general-purpose processors, one or more special-purpose processors (such as digital signal processor (DSP) chips, graphics acceleration processors, application specific integrated circuits (ASICs), and/or the like), and/or other processing structures or means. As shown in FIG. 12, some embodiments may have a separate DSP 1220, depending on desired functionality. Location determination and/or other determinations based on wireless communication may be provided in the processing unit(s) 1210 and/or wireless communication interface 1230 (discussed below). The UE 105 also can include one or more input devices 1270, which can include without limitation one or more keyboards, touch screens, touch pads, microphones, buttons, dials, switches, and/or the like; and one or more output devices 1215, which can include without limitation one or more displays (e.g., touch screens), light emitting diodes (LEDs), speakers, and/or the like.

The UE 105 may also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 1230 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1232 that send and/or receive wireless signals 1234. According to some embodiments, the wireless communication antenna(s) 1232 may comprise a plurality of discrete antennas, antenna arrays, or any combination thereof. The antenna(s) 1232 may be capable of transmitting and receiving wireless signals using beams (e.g., Tx beams and Rx beams). Beam formation may be performed using digital and/or analog beam formation techniques, with respective digital and/or analog circuitry. The wireless communication interface 1230 may include such circuitry.

Depending on desired functionality, the wireless communication interface 1230 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1240. Sensor(s) 1240 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1280 capable of receiving signals 1284 from one or more GNSS satellites using an antenna 1282 (which could be the same as antenna 1232). Positioning based on GNSS signal measurement can be utilized to complement and/or incorporate the techniques described herein. The GNSS receiver 1280 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1280 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1280 is illustrated in FIG. 12 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1210, DSP 1220, and/or a processing unit within the wireless communication interface 1230 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1210 or DSP 1220.

The UE 105 may further include and/or be in communication with a memory 1260. The memory 1260 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1260 of the UE 105 also can comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the UE 105 (and/or processing unit(s) 1210 or DSP 1220 within UE 105). In an aspect, then such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for positioning of a first user equipment (UE), the method comprising:
  identifying, by the first UE, a second UE from a plurality of UEs based on positioning properties of the second UE;
  transmitting, by the first UE to the second UE, a first message including one or more characteristics of a transmission of a first reference signal of the first UE;
  receiving, by the first UE from the second UE and based on the transmitting of the first message, a second message including one or more characteristics of a transmission of a second reference signal of the second UE;
  transmitting, by the first UE to the second UE and based on the receiving of the second message, the first reference signal based on the one or more characteristics of the transmission of the first reference signal;
  receiving, by the first UE from the second UE and based on the transmitting of the first reference signal, the second reference signal based on the one or more characteristics of the transmission of the second reference signal;
  transmitting, by the first UE to the second UE and based on receiving the second reference signal, a third message including at least an indication that the first UE receives the second reference signal; and
  receiving, from the second UE and based on the transmitting of the third message, a fourth message including timing data related to a departure time of the second reference signal, timing data related to an arrival time of the first reference signal, and a location of the second UE at the departure time of the second reference signal.

Clause 2. The method of clause 1, further comprising determining a location of the first UE with respect to the location of the second UE based on the timing data related to the departure time of the second reference signal, timing data related to an arrival time of the first reference signal, or the location of the second UE at the departure time of the second reference signal, or a combination thereof.

Clause 3. The method of clause 1, wherein the one or more characteristics of the transmission of the first reference signal include an identification (ID) of the first reference signal, timing data indicating a time when the first UE transmits the first reference signal to the second UE, or frequency data indicating a frequency used by the first UE to transmit the first reference signal to the second UE, or a combination thereof.

Clause 4. The method of clause 1, wherein the one or more characteristics of the transmission of the second reference signal include an identification (ID) of the second reference signal, timing data indicating a time when the second UE transmits the second reference signal, or frequency data indicating a frequency used by the second UE to transmit the second reference signal to the first UE, or a combination thereof.

Clause 5. The method of clause 1, wherein the transmitting of the first message and the third message and the receiving of the second message and the fourth message are performed using licensed spectrum.

Clause 6. The method of clause 1, wherein the transmitting of the first reference signal and the receiving of the second reference signal are performed using unlicensed spectrum.

Clause 7. The method of clause 1, wherein the positioning properties of the second UE includes a direction that the second UE is moving, a location confidence of the second UE, a velocity of the second UE, or a location of the second UE, or a combination thereof.

Clause 8. The method of clause 7, wherein the first UE identifies the second UE from the plurality of UEs based on the second UE having a higher location confidence than a location confidence of the first UE.

Clause 9. The method of clause 7, wherein the first UE identifies the second UE from the plurality of UEs based on the second UE moving in a direction different from a direction that the first UE is moving.

Clause 10. The method of clause 7, wherein the transmitting of the first message, the first reference signal and the third message, and the receiving of the second message, the second reference signal and the fourth message are repeated for a number of cycles, and wherein a location of the second UE of a first cycle is different from a location of the second UE of a second cycle.

Clause 11. The method of clause 1, wherein the third message transmitted by the first UE to the second UE further includes timing data related to a departure time of the first reference signal, timing data related to an arrival time of the second reference signal, and a location of the first UE at the departure time of the first reference signal to enable the second UE to position itself relative to the location of the first UE.

Clause 12. The method of clause 1, further comprising:
identifying, by the first UE, a third UE from a plurality of UEs based on positioning properties of the third UE;

transmitting, by the first UE to the third UE, a fifth message including one or more characteristics of a transmission of a third reference signal of the first UE;

receiving, by the first UE from the third UE and based on the transmitting of the fifth message, a sixth message including one or more characteristics of a transmission of a fourth reference signal of the third UE;

transmitting, by the first UE to the third UE and based on the receiving of the sixth message, the third reference signal based on the one or more characteristics of the transmission of the third reference signal;

receiving, by the first UE from the third UE and based on the transmitting of the third reference signal, the fourth reference signal based on the one or more characteristics of the transmission of the fourth reference signal;

transmitting, by the first UE to the third UE and based on receiving the fourth reference signal, a seventh message including at least an indication that the first UE receives the fourth reference signal; and receiving, from the third UE and based on the transmitting of the seventh message, an eighth message including timing data related to a departure time of the fourth reference signal, timing data related to an arrival time of the third reference signal, and a location of the third UE at the departure time of the fourth reference signal.

Clause 13. A first user equipment (UE) for wireless communication, the first UE comprising:
one or more transceivers;
memory; and
one or more processors communicatively coupled with the memory and the one or more transceivers, the one or more processors configured to:
identify, by the first UE, a second UE from a plurality of UEs based on positioning properties of the second UE;
transmit, by the first UE to the second UE, a first message including one or more characteristics of a transmission of a first reference signal of the first UE;
receive, by the first UE from the second UE and based on the transmitting of the first message, a second message including one or more characteristics of a transmission of a second reference signal of the second UE;
transmit, by the first UE to the second UE and based on the receiving of the second message, the first reference signal based on the one or more characteristics of the transmission of the first reference signal;
receive, by the first UE from the second UE and based on the transmitting of the first reference signal, the second reference signal based on the one or more characteristics of the transmission of the second reference signal;
transmit, by the first UE to the second UE and based on receiving the second reference signal, a third message including at least an indication that the first UE receives the second reference signal; and
receive, from the second UE and based on the transmitting of the third message, a fourth message including timing data related to a departure time of the second reference signal, timing data related to an arrival time of the first reference signal, and a location of the second UE at the departure time of the second reference signal.

Clause 14. The first UE of clause 13, wherein the one or more processors is further configured to determine a location of the first UE with respect to the location of the second UE based on the timing data related to the departure time of the second reference signal, timing data related to an arrival time of the first reference signal, or the location of the second UE at the departure time of the second reference signal, or a combination thereof.

Clause 15. The first UE of clause 13, wherein the one or more characteristics of the transmission of the first reference signal include an identification (ID) of the first reference signal, timing data indicating a time when the first UE transmits the first reference signal to the second UE, or frequency data indicating a frequency used by the first UE to transmit the first reference signal to the second UE, or a combination thereof.

Clause 16. The first UE of clause 13, wherein the one or more characteristics of the transmission of the second reference signal include an identification (ID) of the second reference signal, timing data indicating a time when the second UE transmits the second reference signal, or frequency data indicating a frequency used by the second UE to transmit the second reference signal to the first UE, or a combination thereof.

Clause 17. The first UE of clause 13, wherein transmitting of the first message and the third message and receiving of the second message and the fourth message are performed using licensed spectrum.

Clause 18. The first UE of clause 13, wherein transmitting of the first reference signal and receiving of the second reference signal are performed using unlicensed spectrum.

Clause 19. The first UE of clause 13, wherein the positioning properties of the second UE includes a direction that the second UE is moving, a location confidence of the second UE, a velocity of the second UE, or a location of the second UE, or a combination thereof.

Clause 20. The first UE of clause 19, wherein the first UE identifies the second UE from the plurality of UEs based on the second UE having a higher location confidence than a location confidence of the first UE.

Clause 21. The first UE of clause 19, wherein the first UE identifies the second UE from the plurality of UEs based on the second UE moving in a direction different from a direction that the first UE is moving.

Clause 22. The first UE of clause 19, wherein transmitting of the first message, the first reference signal and the third message, and receiving of the second message, the second reference signal and the fourth message are repeated for a number of cycles, and wherein a location of the second UE of a first cycle is different from a location of the second UE of a second cycle.

Clause 23. The first UE of clause 13, wherein the third message transmitted by the first UE to the second UE further includes timing data related to a departure time of the first reference signal, timing data related to an arrival time of the second reference signal, and a location of the first UE at the departure time of the first reference signal to enable the second UE to position itself relative to the location of the first UE.

Clause 24. The first UE of clause 13, wherein the one or more processors is further configured to:
identify, by the first UE, a third UE from a plurality of UEs based on positioning properties of the third UE;
transmit, by the first UE to the third UE, a fifth message including one or more characteristics of a transmission of a third reference signal of the first UE;
receive, by the first UE from the third UE and based on the transmitting of the fifth message, a sixth message including one or more characteristics of a transmission of a fourth reference signal of the third UE;
transmit, by the first UE to the third UE and based on the receiving of the sixth message, the third reference signal based on the one or more characteristics of the transmission of the third reference signal;
receive, by the first UE from the third UE and based on the transmitting of the third reference signal, the fourth reference signal based on the one or more characteristics of the transmission of the fourth reference signal;
transmit, by the first UE to the third UE and based on receiving the fourth reference signal, a seventh message including at least an indication that the first UE receives the fourth reference signal; and
receive, from the third UE and based on the transmitting of the seventh message, an eighth message including timing data related to a departure time of the fourth reference signal, timing data related to an arrival time of the third reference signal, and a location of the third UE at the departure time of the fourth reference signal.

Clause 25. A method for positioning of an initiator user equipment (UE), the method performed by a responder UE and comprising:
receiving, from the initiator UE, a first message including one or more characteristics of a transmission of a first reference signal of the initiator UE, wherein the responder UE is identified by the initiator UE from a plurality of UEs based on positioning properties of the responder UE;
transmitting, to the initiator UE, a second message including one or more characteristics of a transmission of a second reference signal of the responder UE;
receiving, from the initiator UE and based on transmitting the second message, the first reference signal based on the one or more characteristics of the transmission of the first reference signal;
transmitting, to the initiator UE and based on receiving the first reference signal, the second reference signal based on the one or more characteristics of the transmission of the second reference signal;
receiving, from the initiator UE and based on the transmitting the second reference signal, a third message including at least an indication that the initiator UE receives the second reference signal; and
transmitting, to the initiator UE and based on the receiving of the third message from the initiator UE, a fourth message including timing data related to a departure time of the second reference signal, timing data related to an arrival time of the first reference signal, and a location of the responder UE at the departure time of the second reference signal.

Clause 26. The method of clause 25, wherein the one or more characteristics of the transmission of the first reference signal includes an identification (ID) of the first reference signal, timing data related to a time slot used by the initiator UE to send the first reference signal to the responder UE, or frequency data related to a frequency used by the initiator UE to send the first reference signal to the responder UE, or a combination thereof.

Clause 27. The method of clause 25, wherein the one or more characteristics of the transmission of the second reference signal includes an identification (ID) of the second reference signal, timing data related to a time slot used by the responder UE to send the second reference signal to the initiator UE, or frequency data related to a frequency used by the responder UE to send the second reference signal to the initiator UE, or a combination thereof.

Clause 28. The method of clause 25, wherein the receiving of the first message and the third message and the transmitting of the second message and the fourth message are performed using licensed spectrum.

Clause 29. The method of clause 25, wherein the receiving of the first reference signal and the transmitting of the second reference signal are performed using unlicensed spectrum.

Clause 30. The method of clause 25, wherein the positioning properties of the responder UE includes a direction that the responder UE is moving, a location confidence of the responder UE, a velocity of the responder UE, or a location of the responder UE, or a combination thereof.

Clause 31. The method of clause 30, wherein a location confidence of the responder UE is higher than a location confidence of the initiator UE.

Clause 32. The method of clause 25, wherein the initiator UE identifies the responder UE from the plurality of UEs based on the responder UE moving in a direction different from a direction that the initiator UE is moving.

Clause 33. A responder user equipment (UE) for wireless communication, the responder UE comprising:
a transceiver;
memory; and
one or more processors communicatively coupled with the memory and the transceiver, the one or more processors configured to:
receive, from an initiator UE, a first message including one or more characteristics of a transmission of a first reference signal of the initiator UE, wherein the responder UE is identified by the initiator UE from a plurality of UEs based on positioning properties of the responder UE;
transmit, to the initiator UE, a second message including one or more characteristics of a transmission of a second reference signal of the responder UE;
receive, from the initiator UE and based on transmitting the second message, the first reference signal based on the one or more characteristics of the transmission of the first reference signal;
transmit, to the initiator UE and based on receiving the first reference signal, the second reference signal based on the one or more characteristics of the transmission of the second reference signal;
receive, from the initiator UE and based on the transmitting the second reference signal, a third message including at least an indication that the initiator UE receives the second reference signal; and
transmit, to the initiator UE and based on the receiving of the third message from the initiator UE, a fourth message including timing data related to a departure time of the second reference signal, timing data related to an arrival time of the first reference signal, and a location of the responder UE at the departure time of the second reference signal.

Clause 34. The responder UE of clause 33, wherein the one or more characteristics of the transmission of the first reference signal includes an identification (ID) of the first reference signal, timing data related to a time slot used by the initiator UE to send the first reference signal to the responder UE, or frequency data related to a frequency used by the initiator UE to send the first reference signal to the responder UE, or a combination thereof.

Clause 35. The responder UE of clause 33, wherein the one or more characteristics of the transmission of the second reference signal includes an identification (ID) of the second reference signal, timing data related to a time slot used by the responder UE to send the second reference signal to the initiator UE, or frequency data related to a frequency used by the responder UE to send the second reference signal to the initiator UE, or a combination thereof.

Clause 36. The responder UE of clause 33, wherein the first message and the third message are received by the responder UE using a licensed spectrum, and wherein the second message and the fourth message are transmitted by the responder UE using the licensed spectrum.

Clause 37. The responder UE of clause 33, wherein the first reference signal is received by the responder UE using an unlicensed spectrum, and wherein the second reference signal is transmitted by the responder UE using the unlicensed spectrum.

Clause 38. The responder UE of clause 33, wherein the positioning properties of the responder UE includes a direction that the responder UE is moving, a location confidence of the responder UE, or a velocity of the responder UE, and a location of the responder UE, or a combination thereof.

Clause 39. The responder UE of claim 38, wherein a location confidence of the responder UE is higher than a location confidence of the initiator UE.

Clause 40. The responder UE of clause 38, wherein the initiator UE identifies the responder UE from the plurality of UEs based on the responder UE moving in a direction different from a direction that the initiator UE is moving.

What is claimed is:

1. A method for positioning of a first user equipment (UE), the method comprising:
identifying, by the first UE, a second UE from a plurality of UEs based on positioning properties of the second UE;
transmitting, by the first UE to the second UE, a first message including one or more characteristics of a transmission of a first reference signal of the first UE;
receiving, by the first UE from the second UE and based on the transmitting of the first message, a second message including one or more characteristics of a transmission of a second reference signal of the second UE;
transmitting, by the first UE to the second UE and based on the receiving of the second message, the first reference signal based on the one or more characteristics of the transmission of the first reference signal;
receiving, by the first UE from the second UE and based on the transmitting of the first reference signal, the second reference signal based on the one or more characteristics of the transmission of the second reference signal;
transmitting, by the first UE to the second UE and based on receiving the second reference signal, a third message including at least an indication that the first UE receives the second reference signal; and
receiving, from the second UE and based on the transmitting of the third message, a fourth message including timing data related to a departure time of the second reference signal, timing data related to an arrival time of the first reference signal, and a location of the second UE at the departure time of the second reference signal.

2. The method of claim 1, further comprising:
determining a location of the first UE with respect to the location of the second UE based on the timing data related to the departure time of the second reference signal, timing data related to the arrival time of the first reference signal, or the location of the second UE at the departure time of the second reference signal, or a combination thereof.

3. The method of claim 1, wherein the one or more characteristics of the transmission of the first reference signal include an identification (ID) of the first reference signal, timing data indicating a time when the first UE transmits the first reference signal to the second UE, or frequency data indicating a frequency used by the first UE to transmit the first reference signal to the second UE, or a combination thereof.

4. The method of claim 1, wherein the one or more characteristics of the transmission of the second reference signal include an identification (ID) of the second reference signal, timing data indicating a time when the second UE transmits the second reference signal, or frequency data indicating a frequency used by the second UE to transmit the second reference signal to the first UE, or a combination thereof.

5. The method of claim 1, wherein the transmitting of the first message and the third message and the receiving of the second message and the fourth message are performed using licensed spectrum.

6. The method of claim 1, wherein the transmitting of the first reference signal and the receiving of the second reference signal are performed using unlicensed spectrum.

7. The method of claim 1, wherein the positioning properties of the second UE includes a direction that the second UE is moving, a location confidence of the second UE, a velocity of the second UE, or a location of the second UE, or a combination thereof.

8. The method of claim 7, wherein the first UE identifies the second UE from the plurality of UEs based on the second UE having a higher location confidence than a location confidence of the first UE.

9. The method of claim 7, wherein the first UE identifies the second UE from the plurality of UEs based on the second UE moving in a direction different from a direction that the first UE is moving.

10. The method of claim 7, wherein the transmitting of the first message, the first reference signal and the third message, and the receiving of the second message, the second reference signal and the fourth message are repeated for a number of cycles, and wherein a location of the second UE of a first cycle is different from a location of the second UE of a second cycle.

11. The method of claim 1, wherein the third message transmitted by the first UE to the second UE further includes timing data related to a departure time of the first reference signal, timing data related to an arrival time of the second reference signal, and a location of the first UE at the departure time of the first reference signal to enable the second UE to position itself relative to the location of the first UE.

12. The method of claim 1, further comprising:
identifying, by the first UE, a third UE from a plurality of UEs based on positioning properties of the third UE;
transmitting, by the first UE to the third UE, a fifth message including one or more characteristics of a transmission of a third reference signal of the first UE;
receiving, by the first UE from the third UE and based on the transmitting of the fifth message, a sixth message including one or more characteristics of a transmission of a fourth reference signal of the third UE;
transmitting, by the first UE to the third UE and based on the receiving of the sixth message, the third reference signal based on the one or more characteristics of the transmission of the third reference signal;
receiving, by the first UE from the third UE and based on the transmitting of the third reference signal, the fourth reference signal based on the one or more characteristics of the transmission of the fourth reference signal;
transmitting, by the first UE to the third UE and based on receiving the fourth reference signal, a seventh message including at least an indication that the first UE receives the fourth reference signal; and
receiving, from the third UE and based on the transmitting of the seventh message, an eighth message including timing data related to a departure time of the fourth reference signal, timing data related to an arrival time of the third reference signal, and a location of the third UE at the departure time of the fourth reference signal.

13. A first user equipment (UE) for wireless communication, the first UE comprising:
one or more transceivers;
memory; and
one or more processors communicatively coupled with the memory and the one or more transceivers, the one or more processors configured to:
identify, by the first UE, a second UE from a plurality of UEs based on positioning properties of the second UE;
transmit, by the first UE to the second UE, a first message including one or more characteristics of a transmission of a first reference signal of the first UE;
receive, by the first UE from the second UE and based on the transmitting of the first message, a second message including one or more characteristics of a transmission of a second reference signal of the second UE;
transmit, by the first UE to the second UE and based on the receiving of the second message, the first reference signal based on the one or more characteristics of the transmission of the first reference signal;
receive, by the first UE from the second UE and based on the transmitting of the first reference signal, the second reference signal based on the one or more characteristics of the transmission of the second reference signal;
transmit, by the first UE to the second UE and based on receiving the second reference signal, a third message including at least an indication that the first UE receives the second reference signal; and
receive, from the second UE and based on the transmitting of the third message, a fourth message including timing data related to a departure time of the second reference signal, timing data related to an arrival time of the first reference signal, and a location of the second UE at the departure time of the second reference signal.

14. The first UE of claim 13, wherein the one or more processors is further configured to determine a location of the first UE with respect to the location of the second UE based on the timing data related to the departure time of the second reference signal, timing data related to the arrival time of the first reference signal, or the location of the second UE at the departure time of the second reference signal, or a combination thereof.

15. The first UE of claim 13, wherein the one or more characteristics of the transmission of the first reference signal include an identification (ID) of the first reference signal, timing data indicating a time when the first UE transmits the first reference signal to the second UE, or frequency data indicating a frequency used by the first UE to transmit the first reference signal to the second UE, or a combination thereof.

16. The first UE of claim 13, wherein the one or more characteristics of the transmission of the second reference signal include an identification (ID) of the second reference signal, timing data indicating a time when the second UE transmits the second reference signal, or frequency data indicating a frequency used by the second UE to transmit the second reference signal to the first UE, or a combination thereof.

17. The first UE of claim 13, wherein transmitting of the first message and the third message and receiving of the second message and the fourth message are performed using licensed spectrum.

18. The first UE of claim 13, wherein transmitting of the first reference signal and receiving of the second reference signal are performed using unlicensed spectrum.

19. The first UE of claim 13, wherein the positioning properties of the second UE includes a direction that the second UE is moving, a location confidence of the second UE, a velocity of the second UE, or a location of the second UE, or a combination thereof.

20. The first UE of claim 19, wherein the first UE identifies the second UE from the plurality of UEs based on the second UE having a higher location confidence than a location confidence of the first UE.

21. The first UE of claim 19, wherein the first UE identifies the second UE from the plurality of UEs based on the second UE moving in a direction different from a direction that the first UE is moving.

22. The first UE of claim 19, wherein transmitting of the first message, the first reference signal and the third message, and receiving of the second message, the second reference signal and the fourth message are repeated for a number of cycles, and wherein a location of the second UE of a first cycle is different from a location of the second UE of a second cycle.

23. The first UE of claim 13, wherein the third message transmitted by the first UE to the second UE further includes timing data related to a departure time of the first reference signal, timing data related to an arrival time of the second reference signal, and a location of the first UE at the departure time of the first reference signal to enable the second UE to position itself relative to the location of the first UE.

24. The first UE of claim 13, wherein the one or more processors is further configured to:
   identify, by the first UE, a third UE from a plurality of UEs based on positioning properties of the third UE;
   transmit, by the first UE to the third UE, a fifth message including one or more characteristics of a transmission of a third reference signal of the first UE;
   receive, by the first UE from the third UE and based on the transmitting of the fifth message, a sixth message including one or more characteristics of a transmission of a fourth reference signal of the third UE;
   transmit, by the first UE to the third UE and based on the receiving of the sixth message, the third reference signal based on the one or more characteristics of the transmission of the third reference signal;
   receive, by the first UE from the third UE and based on the transmitting of the third reference signal, the fourth reference signal based on the one or more characteristics of the transmission of the fourth reference signal;
   transmit, by the first UE to the third UE and based on receiving the fourth reference signal, a seventh message including at least an indication that the first UE receives the fourth reference signal; and
   receive, from the third UE and based on the transmitting of the seventh message, an eighth message including timing data related to a departure time of the fourth reference signal, timing data related to an arrival time of the third reference signal, and a location of the third UE at the departure time of the fourth reference signal.

25. A method for positioning of an initiator user equipment (UE), the method performed by a responder UE and comprising:
   receiving, from the initiator UE, a first message including one or more characteristics of a transmission of a first reference signal of the initiator UE, wherein the responder UE is identified by the initiator UE from a plurality of UEs based on positioning properties of the responder UE;
   transmitting, to the initiator UE, a second message including one or more characteristics of a transmission of a second reference signal of the responder UE;
   receiving, from the initiator UE and based on transmitting the second message, the first reference signal based on the one or more characteristics of the transmission of the first reference signal;
   transmitting, to the initiator UE and based on receiving the first reference signal, the second reference signal based on the one or more characteristics of the transmission of the second reference signal;
   receiving, from the initiator UE and based on the transmitting the second reference signal, a third message including at least an indication that the initiator UE receives the second reference signal; and
   transmitting, to the initiator UE and based on the receiving of the third message from the initiator UE, a fourth message including timing data related to a departure time of the second reference signal, timing data related to an arrival time of the first reference signal, and a location of the responder UE at the departure time of the second reference signal.

26. The method of claim 25, wherein the one or more characteristics of the transmission of the first reference signal includes an identification (ID) of the first reference signal, timing data related to a time slot used by the initiator UE to send the first reference signal to the responder UE, or frequency data related to a frequency used by the initiator UE to send the first reference signal to the responder UE, or a combination thereof.

27. The method of claim 25, wherein the one or more characteristics of the transmission of the second reference signal includes an identification (ID) of the second reference signal, timing data related to a time slot used by the responder UE to send the second reference signal to the initiator UE, or frequency data related to a frequency used by the responder UE to send the second reference signal to the initiator UE, or a combination thereof.

28. The method of claim 25, wherein the receiving of the first message and the third message and the transmitting of the second message and the fourth message are performed using licensed spectrum.

29. The method of claim 25, wherein the receiving of the first reference signal and the transmitting of the second reference signal are performed using unlicensed spectrum.

30. The method of claim 25, wherein the positioning properties of the responder UE includes a direction that the responder UE is moving, a location confidence of the responder UE, a velocity of the responder UE, or a location of the responder UE, or a combination thereof.

31. The method of claim 30, wherein a location confidence of the responder UE is higher than a location confidence of the initiator UE.

32. The method of claim 25, wherein the initiator UE identifies the responder UE from the plurality of UEs based on the responder UE moving in a direction different from a direction that the initiator UE is moving.

33. A responder user equipment (UE) for wireless communication, the responder UE comprising:
a transceiver;
memory; and
one or more processors communicatively coupled with the memory and the transceiver, the one or more processors configured to:
receive, from an initiator UE, a first message including one or more characteristics of a transmission of a first reference signal of the initiator UE, wherein the responder UE is identified by the initiator UE from a plurality of UEs based on positioning properties of the responder UE;
transmit, to the initiator UE, a second message including one or more characteristics of a transmission of a second reference signal of the responder UE;
receive, from the initiator UE and based on transmitting the second message, the first reference signal based on the one or more characteristics of the transmission of the first reference signal;
transmit, to the initiator UE and based on receiving the first reference signal, the second reference signal based on the one or more characteristics of the transmission of the second reference signal;
receive, from the initiator UE and based on the transmitting the second reference signal, a third message including at least an indication that the initiator UE receives the second reference signal; and
transmit, to the initiator UE and based on the receiving of the third message from the initiator UE, a fourth message including timing data related to a departure time of the second reference signal, timing data related to an arrival time of the first reference signal, and a location of the responder UE at the departure time of the second reference signal.

34. The responder UE of claim 33, wherein the one or more characteristics of the transmission of the first reference signal includes an identification (ID) of the first reference signal, timing data related to a time slot used by the initiator UE to send the first reference signal to the responder UE, or frequency data related to a frequency used by the initiator UE to send the first reference signal to the responder UE, or a combination thereof.

35. The responder UE of claim 33, wherein the one or more characteristics of the transmission of the second reference signal includes an identification (ID) of the second reference signal, timing data related to a time slot used by the responder UE to send the second reference signal to the initiator UE, or frequency data related to a frequency used by the responder UE to send the second reference signal to the initiator UE, or a combination thereof.

36. The responder UE of claim 33, wherein the first message and the third message are received by the responder UE using a licensed spectrum, and wherein the second message and the fourth message are transmitted by the responder UE using the licensed spectrum.

37. The responder UE of claim 33, wherein the first reference signal is received by the responder UE using an unlicensed spectrum, and wherein the second reference signal is transmitted by the responder UE using the unlicensed spectrum.

38. The responder UE of claim 33, wherein the positioning properties of the responder UE includes a direction that the responder UE is moving, a location confidence of the responder UE, a velocity of the responder UE, or a location of the responder UE, or a combination thereof.

39. The responder UE of claim 38, wherein a location confidence of the responder UE is higher than a location confidence of the initiator UE.

40. The responder UE of claim 38, wherein the initiator UE identifies the responder UE from the plurality of UEs based on the responder UE moving in a direction different from a direction that the initiator UE is moving.

* * * * *